United States Patent
Backus et al.

[15] 3,688,249
[45] Aug. 29, 1972

[54] METHOD FOR LOCATING IMPEDANCE DISCOUNTINUITIES IN A WAVE PROPAGATING MEDIUM

[72] Inventors: Milo M. Backus; William A. Schneider, both of Dallas, Tex.

[73] Assignee: Texas Instrument Incorporated, Dallas, Tex.

[22] Filed: July 6, 1970

[21] Appl. No.: 52,512

[52] U.S. Cl. ............................................340/15.5 DP, 340/15.5MC 340/15.5CC
[51] Int. Cl. ...............................................G01v 1/28
[58] Field of Search..............340/15.5 MC, 15.5 DP, 15.5CC

[56] References Cited

UNITED STATES PATENTS

| | | | |
|---|---|---|---|
| 3,353,151 | 11/1967 | Rockwell | 340/15.5 CD |
| 3,564,494 | 2/1971 | Frasier et al. | 340/15.5 MC |
| 3,529,282 | 9/1970 | Brown | 340/15.5 MC |
| 3,105,568 | 10/1963 | Jolly | 340/15.5 CC |
| 3,539,984 | 11/1970 | Schneider | 340/15.5 CC |

*Primary Examiner*—Benjamin A. Borchelt
*Assistant Examiner*—H. A. Birmiel
*Attorney*—Samuel M. Mims, Jr., James O. Dixon, Andrew M. Hassell, Harold Levine, Rene E. Grossman, Melvin Sharp and Richards, Harris & Hubbard

[57] ABSTRACT

A method for digitally processing seismic data, or other similar data derived for propagating wave energy to produce a data image comprised of a plurality of coordinate points is described. Each coordinate point has a value which is a combination of the amplitude values taken from a plurality of primary seismic traces at the travel times on the respective primary traces required for energy to travel from the respective source points to the coordinate point and return to the respective receiving points of the seismic traces. More particularly, the combination is accomplished in such a way as to increase the signal-to-noise ratio by selected data to be combined at the respective coordinate points either on a predetermined basis or automatically by an analysis of the data.

11 Claims, 29 Drawing Figures

INVENTORS:
MILO M. BACKUS
WILLIAM A. SCHNEIDER

INVENTORS:
MILO M. BACKUS
WILLIAM A. SCHNEIDER

Patented Aug. 29, 1972

INVENTORS:
MILO M. BACKUS
WILLIAM A. SCHNEIDER

INVENTORS:
MILO M. BACKUS
WILLIAM A. SCHNEIDER

STATIONS

|  | 90 | 91 | 92 | 93 | 94 | 95 | 96 | 97 | 98 | 99 | 100 |
|---|---|---|---|---|---|---|---|---|---|---|---|
| $P_0 b_X$ | 0 | 1 | 2 | 3 | 4 | 5 | 6 | 7 | 8 | 9 | 10 |
| $P_1 b_X$ | 1 | 0 | 1 | 2 | 3 | 4 | 5 | 6 | 7 | 8 | 9 |
| $P_2 b_X$ | 2 | 1 | 0 | 1 | 2 | 3 | 4 | 5 | 6 | 7 | 8 |
| $P_3 b_X$ | 3 | 2 | 1 | 0 | 1 | 2 | 3 | 4 | 5 | 6 | 7 |
| $P_4 b_X$ | 4 | 3 | 2 | 1 | 0 | 1 | 2 | 3 | 4 | 5 | 6 |
| $P_5 b_X$ | 5 | 4 | 3 | 2 | 1 | 0 | 1 | 2 | 3 | 4 | 5 |
| $P_6 b_X$ | 6 | 5 | 4 | 3 | 2 | 1 | 0 | 1 | 2 | 3 | 4 |
| $P_7 b_X$ | 7 | 6 | 5 | 4 | 3 | 2 | 1 | 0 | 1 | 2 | 3 |
| $P_8 b_X$ | 8 | 7 | 6 | 5 | 4 | 3 | 2 | 1 | 0 | 1 | 2 |
| $P_9 b_X$ | 9 | 8 | 7 | 6 | 5 | 4 | 3 | 2 | 1 | 0 | 1 |
| $P_{10} b_X$ | 10 | 9 | 8 | 7 | 6 | 5 | 4 | 3 | 2 | 1 | 0 |

INVENTORS:
MILO M. BACKUS
WILLIAM A. SCHNEIDER

INVENTORS:
MILO M. BACKUS
WILLIAM A. SCHNEIDER

INVENTORS:
MILO M. BACKUS
WILLIAM A. SCHNEIDER

INVENTORS:
MILO M. BACKUS
WILLIAM A. SCHNEIDER

INVENTORS:
MILO M. BACKUS
WILLIAM A. SCHNEIDER

INVENTORS:
MILO M. BACKUS
WILLIAM A. SCHNEIDER

| $b_{00}$ | $b_{01}$ | $b_{02}$ | $b_{03}$ ----- $b_{0n}$ |
| | | | |
| $b_{10}$ | $b_{11}$ | $b_{12}$ | $b_{13}$ ----- $b_{1n}$ |
| | | | |
| $b_{20}$ | $b_{21}$ | $b_{22}$ | $b_{23}$ ----- $b_{2n}$ |
| | | | |
| $b_{30}$ | $b_{31}$ | $b_{32}$ | $b_{33}$ ----- $b_{3n}$ |
| $b_{m0}$ | $b_{m1}$ | $b_{m2}$ | $b_{m3}$ ----- $b_{mn}$ |

INVENTORS:
MILO M. BACKUS
WILLIAM A. SCHNEIDER 3,688,249

METHOD FOR LOCATING IMPEDANCE DISCOUNTINUITIES IN A WAVE PROPAGATING MEDIUM

This invention relates generally to methods and apparatus for processing data representative of wave energy induced at a source point in a wave propagating medium and detected at a receiving point in such a manner as to produce a data image of discontinuities within the medium. The invention is specifically related to methods for determining the location of both diffraction and reflection type acoustic impedance discontinuities of a planet such as Earth.

Extensive research efforts have been expended in recent decades to perfect the art of seismology. Recent events indicate that one of the more significant developments in this art is the method for processing seismic data described and claimed in U.S. Pat. No. 3,353,151, entitled "Common Tangent Stacking Method And System For Locating Sonic Energy Velocity Discontinuities", issued to D. W. Rockwell on Nov. 14, 1967, and assigned to the assignee of this invention.

The Rockwell patent discloses a method for processing seismic data wherein each seismic response record, commonly referred to as a trace, is plotted by either analog or digital apparatus, as a scaled wavefront pattern. Each coordinate point of the scaled wavefront pattern has the amplitude value at the travel time on the trace required for the energy to travel from the source point to the coordinate position and then back to the receiving point. The amplitude values of the scaled wavefront patterns derived from a plurality of traces are then combined at corresponding coordinate points which results in a composite image of the acoustic impedance discontinuities of the subsurface. Stated another way, imagine the volume being explored as a three-dimensional grid. For each source-receiver trace recorded, the travel time from the source to a grid point in the volume and back to the receiver is calculated. The amplitude value of the recorded trace, observed at the calculated time, is added to an accumulating sum associated with the grid point. The resulting set of values obtained over a region of the subsurface grid, as a result of accumulating data from many source-receiver traces, will then show large values at the location of subsurface scatters, such as fault planes, dome boundaries, reefs, unconformities, pinchouts, cavities, rough boundaries, etc., as well as reflecting interfaces. The grid of numbers may be displayed in a number of conventional ways. The composite image so produced has recently been recognized as a form of acoustic hologram, and the method a form of acoustic holography.

There are many advantages of the Rockwell method when compared to previous data processing methods. Perhaps the most significant advantage is that each incremental time interval is plotted in the true migrated mode with respect to either two or three-dimensional space. The method tends to automatically enhance the signal-to-noise ratio. No special constraints in the geometry of the source and receiver are required. The process is applicable to either reflection, diffraction or refraction energy, and in particular provides, for the first time, a practical method for locating energy diffractors or scatterers.

The present invention is concerned with an improvement in the method described and claimed in the above referenced Rockwell patent, and more particularly relates to a method for processing the data so as to further enhance the signal-to-noise ratio and to thus better identify and locate both reflectors and diffractors.

In accordance with this invention, each input trace, derived either from a single source-receiver pair or by stacking the traces from a plurality of source-receiver pairs, is spread to a number of horizontally spaced stations. Then each spread trace is corrected for moveout to the respective station based on the locations of the source and receiver for the input trace relative to the station so that each of the spread traces is corrected to verticality. Then the vertically corrected traces at each interval are combined in a predetermined manner to produce a composite data image. The data image is a coordinate grid. The value at each coordinate point of the grid is a positive or negative value, and the image may be further processed for display in any conventional manner.

More specifically, the invention contemplates enhancement of the composite data image by controlling, either on a predetermined or an automatic basis, the input traces which are to contribute data to certain areas of the composite image. In accordance with a specific aspect of the invention, the detection of specular reflectors is enhanced by selecting only a portion of the vertically corrected traces at the respective stations for combination to produce the composite data image based on a predetermined range of dip angles for the reflectors. This selection may include a scaling or weighting of the values, and may change with depth.

In accordance with another aspect of the invention, specular reflectors can be enhanced by automatically increasing the amplitude values of certain of the vertically corrected traces in accordance with the degree of correspondence between the amplitude values of a particular trace and the amplitude values of one or more collateral traces at the travel times on the collateral traces where energy reflected from the said discontinuity would be found if a discontinuity existed.

In accordance with still another aspect of the invention, the image of scattering or diffracting discontinuities can be enhanced by automatically increasing the amplitude values of the vertically corrected traces at each station in accordance with the degree of correspondence between said amplitude values and the amplitude values on one or more collateral traces at the travel times where energy would be returned from a diffracting discontinuity located at the point represented by said amplitude values.

The novel features believed characteristic of this invention are set forth in the appended claims. The invention itself, however, as well as other objects and advantages thereof, may best be understood by reference to the following detailed description of illustrative embodiments, when read in conjunction with the accompanying drawings, wherein:

Figure 1:
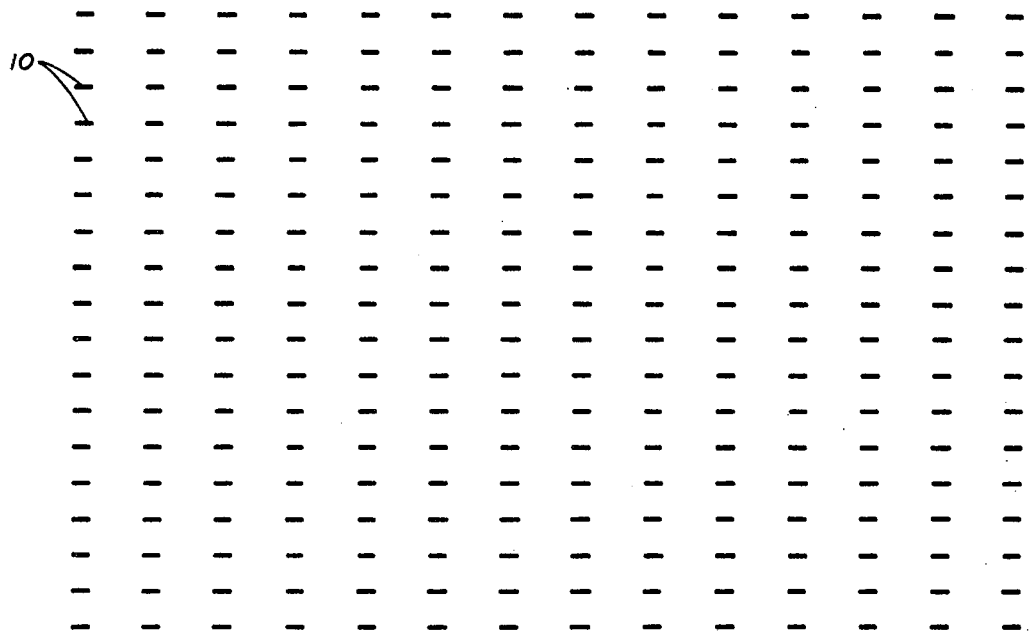
FIG. 1 is a schematic representation of a two-dimensional composite data image in accordance with the present invention.

Referring now to the drawings, FIG. 1 illustrates schematically the type of data image which is to be produced in accordance with the present invention. A datum line D represents a horizontal line which may approximate the surface-air interface of the Earth. The datum line D is divided at equal horizontal intervals to provide stations 86–100, which, of course, may be only one portion of the total image. The data image is comprised of a plurality of coordinate points 10 arranged at equal vertical intervals under each of the stations 86–100 on the datum line D. The stations on the datum line D are typically 100 to 150 feet apart, while the vertical intervals between the coordinate points 10 may be expressed either in equal time increments, or equal depth increments. In either case, the increments will typically represent from 25 to 50 feet. The vertical intervals will hereafter be expressed in depth for convenience unless otherwise stated, although it will be understood that the method may be practiced using either the time or depth domain as in more conventional common depth point stacking.

Each of the coordinate points 10 is comprised of a numerical value, either positive or negative, which is usually expressed in digital machine language. The value at each of the coordinate points of the data image is derived by combining a plurality of amplitude values taken from a plurality of input traces derived from source-receiver pairs as will hereafter be described in detail. The data image shown in FIG. 1 is the type described in the above referenced Rockwell patent. This invention is concerned with an improved method for processing the data to produce a data image having enhanced images.

Figure 2:
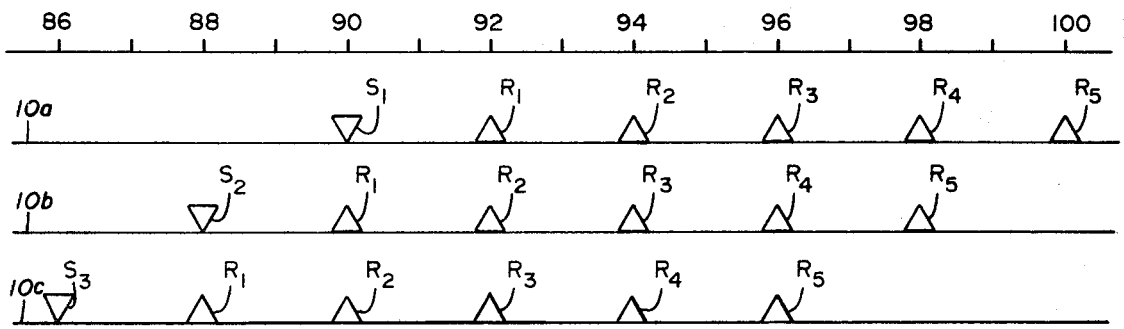
FIG. 2 is a schematic diagram illustrating a conventional method of collecting multicoverage seismic data using common depth point geometry which can also be advantageously processed by the method of the present invention.

A conventional method for collecting seismic data, commonly referred to as the common depth point method is illustrated in FIG. 2. In FIG. 2, lines $10a$–$10c$ represent the surface of either land or water, which overlies a subsurface region in which it is desired to map the acoustic impedance discontinuities.

Assume that seismic energy is first induced at a source point $S_1$, commonly referred to as a shot point, using any conventional means, such as an explosive charge, gas exploder, hydraulic thumper, weight drop or the like. Assume also that shot point $S_1$ is horizontally located at station 90 on datum line D, although the shot point $S_1$ may be above or below the elevation of the datum line. An array of receivers is disposed on the surface 10a to one side of shot point $S_1$ with the receivers located at stations 92, 94, 96, etc. Twenty-four receivers are typically used although only receivers $R_1$–$R_5$ are illustrated in FIG. 2. It should be noted that the receivers are uniformly spaced, and that shot point $S_1$ is typically spaced from receiver $R_1$ by a distance equal to the spacing between the receivers. The acoustic return detected at receivers $R_1$–$R_5$, together with that detected at the other 19 receivers of the spread is typically recorded on a single 24 trace seismogram. These traces may be individually identified by a combination of the shot point designation and the receiver designation, such as traces $S_1R_1$–$S_1R_{24}$, respectively. The values of each of the traces of the seismogram are preferably digital values representing both the amplitude and the phase of the detected acoustic energy. The digital values are typically produced by sampling the detected analog signal at time intervals of one, two or four milliseconds and are recorded on a single multiplexed channel.

After the first seismogram is produced from energy induced at shot point $S_1$, the source is indexed to station 88, as represented by shot point $S_2$, and each of the receivers $R_1$–$R_{24}$ is also indexed two stations, as illustrated on line $10b$, and the shooting process repeated. This produces a second seismogram containing twenty-four traces, which traces can be identified as traces $S_2R_1$-A:$S_2R_{24}$, respectively. The shooting procedure is then repeated with shot point $S_3$ at station 86 and the receivers $R_1$-$R_{24}$ spread at the stations illustrated on line 10c. The shooting procedure is repeated every two stations with the appropriate movement of the receiver spread until the entire area of interest is completed. It is important to understand that the relationship between the shot points, receivers and stations is not critical to the invention, but is a convenience for handling the data in an orderly fashion. In general, a wider spread of stations contributing to the image provides greater horizontal resolution, and a closer density of stations provides greater vertical resolution in the composite data image.

Seismic data collected in this manner is referred to as "common depth point" data. Common depth point data is chosen to illustrate the method of the present invention because the method is ideally suited to process such data, and vast quantities of common depth point data heretofore collected can be advantageously processed in accordance with the method of the present invention to yield better information about the subsurface region than was heretofore possible. However, it is important to understand that the method of the present invention is not limited to common depth point data, but is applicable in its broader aspects to data representative of any wave energy induced at a source point and detected at a receiving point on or within a wave propagating medium such as the Earth, the human body, or any other solid liquid or gaseous body, or even outer space when using energy, such as electromagnetic wave energy, which will propagate through space.

Although the highly ordered nature of common depth point data simplifies data processing, it is to be understood that this invention requires no constraints upon the relative positions of the shot points and the receivers. The receivers need not be spaced at equal horizontal intervals, nor do the successive shot points need be spaced at equal horizontal intervals. Further neither the shot points nor the receivers need to be arrayed in a straight line, as is required for common depth point data. The shot points and the receivers may thus be located at any position, so long as the location of these positions are known. Further, a two-dimensional spread of shot points and receivers can be used to achieve a three-dimensional data image from which any desired two-dimensional section, vertical, horizontal, or at any angle, can be extracted for display, or which may be displayed using three-dimensional display techniques as stereo pairs, holograms, or more conventional three-dimensional drawings.

Figure 3:
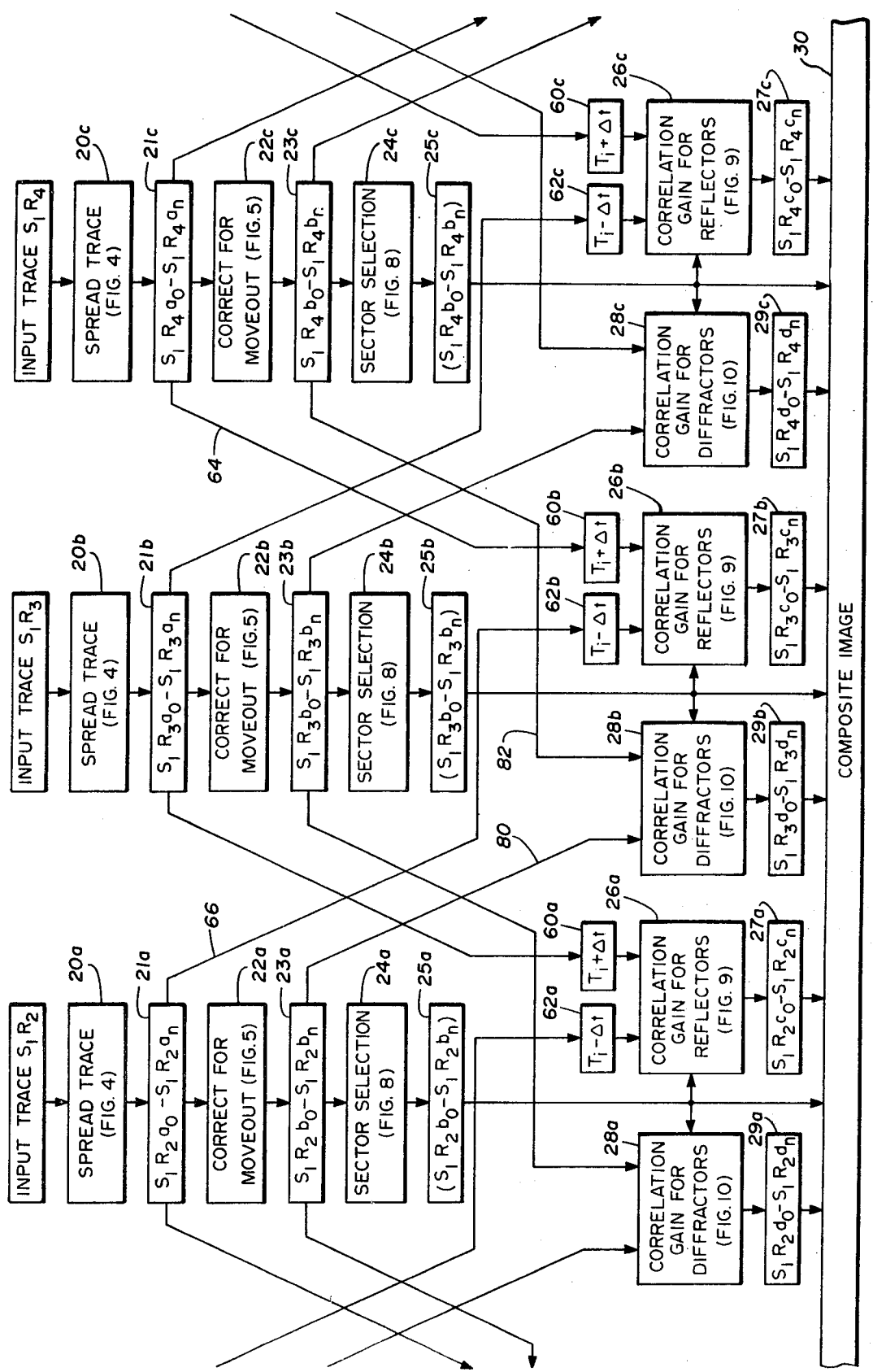
FIG. 3 is a block diagram which illustrates one embodiment of the method of the present invention.

Each of the twenty-four traces $S_xR_1$-$S_xR_{24}$ on each of the seismograms produced from shots $S_1$-$S_n$, respectively, may be an input trace for the method illustrated in FIG. 3, and in all specific examples hereafter discussed, it is assumed that such is the case. However, it is to be understood that the input traces may be preprocessed in substantially any conventional manner prior to input to the method illustrated in FIG. 3, such as for example, to move the shot points and receivers to the datum line, correct for the overburden, or similar techniques. For best results, however, it is desirable to use original traces prior to common depth point stacking since such stacking distorts the data. However, because of the very large number of traces typically produced when collecting common depth point data, it may be desirable to select only a portion of the total numbered traces derived from different source-receiver pairs for processing in order to reduce the operating time of the digital computer. For some applications, common depth point stacked traces may be used as the input traces to the method, as hereafter described in connection with the embodiment of FIG. 11.

FIG. 3 is a block diagram illustrating the manner in which input traces $S_1R_2$, $S_1R_3$ and $S_1R_4$, for example, would be processed by a digital computer in accordance with one embodiment of the present invention. In general, all input traces are processed in parallel as indicated by the identical vertical flow paths for the input traces $S_1R_2$, $S_1R_3$ and $S_1R_4$ shown in FIG. 3. For example, the input traces $S_1R_2$, $S_1R_3$ and $S_1R_4$ are first spread as represented at blocks 20a, 20b and 20c, respectively.

Figure 4:
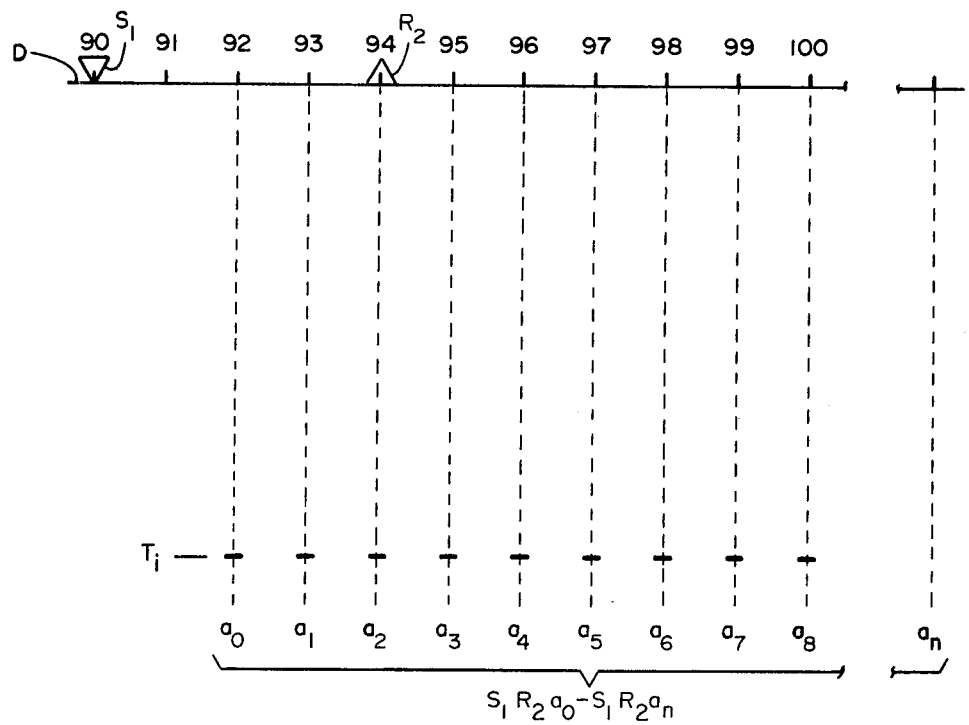
FIG. 4 is a schematic diagram which illustrates one step of the method represented in FIG. 3.

The spreading operation of block 20a, for example, is illustrated in detail in FIG. 4 and comprises merely reproducing the input trace $S_1R_2$ to produce a plurality of identical traces $S_1R_2a_0$-$S_1R_2a_n$. Since shot point $S_1$ was located at station 90 and receiver $R_2$ at station 94, the traces $S_1R_2a_0$-$S_1R_2a_n$ are spread consecutively from station 92, which is the center point between shot point $S_1$ and receiver $R_2$, over the higher numbered stations. It will be noted that this occupies only a half space of the total sector from which the acoustic energy could have been returned to the receiver. Assuming that the acoustic velocity is the same on each side of the center point of the spread, traces $S_1R_2a_0$-$S_1R_2a_n$, and all further traces derived therefrom, can be reproduced beginning at station 92 and proceeding to lower numbered stations. If the velocity is not the same when propagating in different directions from the center point, the processing of traces $S_1R_2a_1$-$S_1R_2a_n$ can be repeated using different velocity values and the traces designated by different characters, such as by -$S_1R_2a_1$ through -$S_1R_2a_n$. Since the traces $S_1R_2a_0$-$S_1R_2a_n$ are merely duplications of the input trace $S_1R_2$, the amplitude values at travel time $T_t$ on all traces would appear at the same apparent depth as illustrated in FIG. 4.

Figures 6, 7:
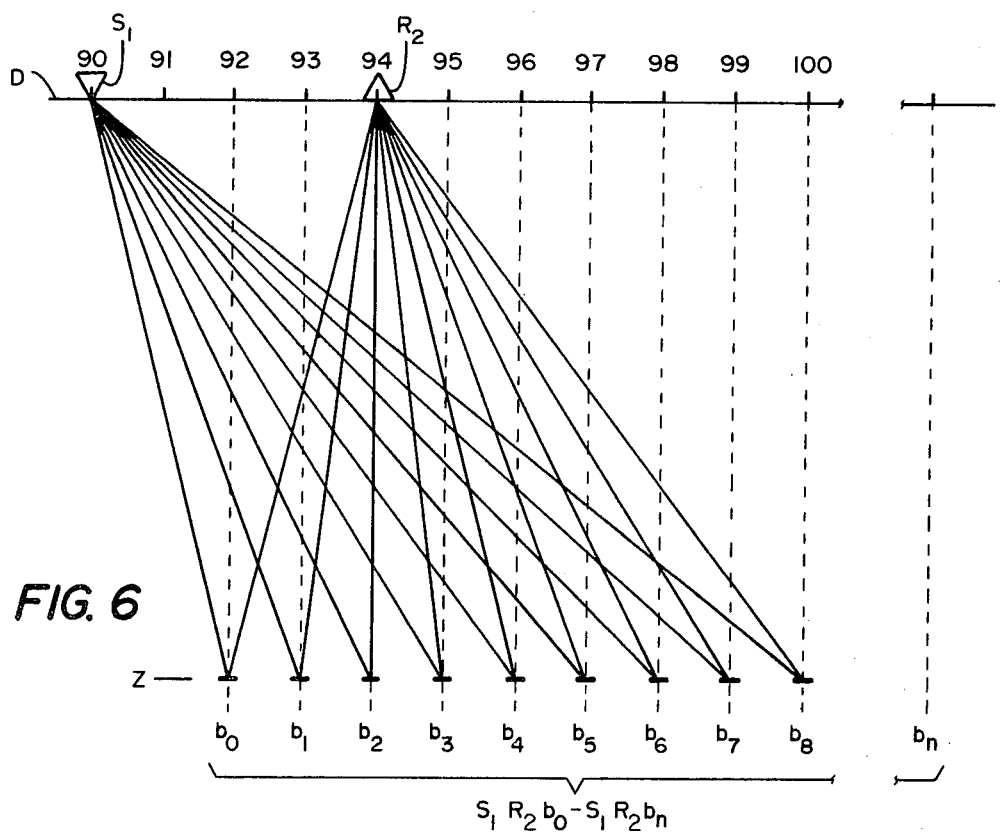
FIG. 6 is a schematic diagram which also illustrates the method step illustrated in FIG. 5.
FIG. 7 is a table setting forth the traces which are assigned to the respective stations in accordance with the method of FIG. 3.

The outputs from steps 20a-20c are spreads of traces $S_1R_2a_0$-$S_1R_2a_n$, $S_1R_3a_0$-$S_1R_3a_n$ and $S_1R_4a_0$-$S_1R_4a_n$, which are represented by blocks 21a-21c, respectively, in FIG. 3, and which are assigned to the stations according to the table of FIG. 7.

Figure 5:
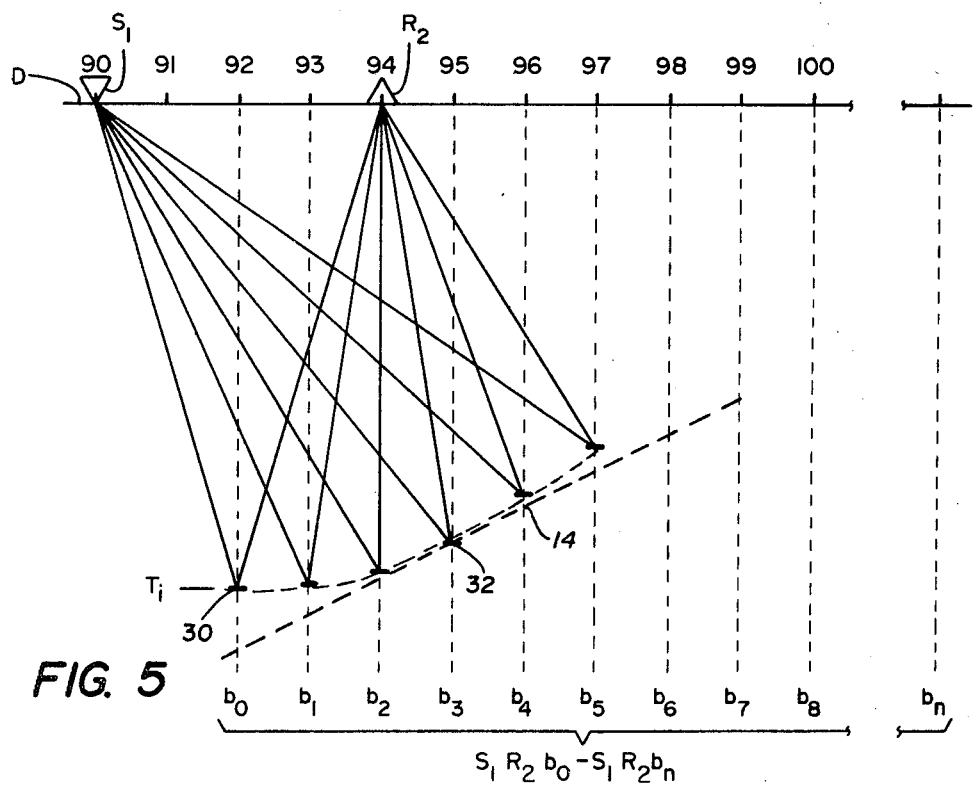
FIG. 5 is a schematic diagram which illustrates another step in the method represented in FIG. 3.

Next, each of the spreads of traces 21a-21c is corrected for moveout as represented by blocks 22a-22c, with spread 21a being illustrated in detail in FIGS. 5 and 6, to produce spreads 23a-23c, respectively, which includes traces $S_1R_2b_0$-$S_1R_2b_n$, $S_1R_3b_0$-$S_1R_3b_n$, and $S_1R_4b_0$-$S_1R_4b_n$, respectively. Each trace of each spread 23a-23 is comprised of a series of amplitude values sampled at uniform depth intervals, and are thus equivalent to a series of vertically spaced coordinate points. As mentioned previously, these uniform depth intervals can be uniform elapsed time intervals, rather than depth intervals. The depth intervals of the trace spreads 23a-23c are conveniently the same depth intervals as the coordinate points 10 of the composite data image illustrated in FIG. 1, although for some purposes it may be desirable to retain greater resolution by providing shorter vertical intervals. Each of the traces of spreads 23a–23c are produced by correcting the corresponding traces of the spread traces 21a–21c for moveout in accordance with the equation:

$$Ti = \sqrt{\frac{Z^2}{V_a^2} + \frac{Y^2 + \left(\frac{Li}{2}+x\right)^2}{V_R^2}} + \sqrt{\frac{Z^2}{V_a^2} + \frac{Y^2 + \left(\frac{Li}{2}-X\right)^2}{V_R^2}} \quad (1)$$

where Li is the distance between the source-receiver pair for the input trace, $T_i$ is the travel time to the coordinate point (X, Y, Z) in a coordinate system using the center point between the source-receiver pair as the origin, X the distance along datum line D, Y the horizontal offset from the datum line D, Z the depth, Va the average velocity at depth Z and $V_R$ the RMS velocity at depth Z. As a result, the amplitude value stored at each vertical coordinate point of each of the spread traces 23a–23c is the value at the travel time $T_i$ on the respective input traces $S_1R_2$–$S_1R_4$, and hence on spread traces 21a–21c, required for the acoustic energy to travel from the shot point $S_1$ to the respective coordinate point and return to the receiver for the respective input traces. Since it is adequate for most frequencies to utilize vertical spacing between the coordinate points of traces 23a–23c of 25 to 50 feet, it will sometimes be necessary to interpolate between the digital values at the sampling intervals of traces 21a–21c to provide the appropriate digital amplitude value for the respective vertically spaced coordinate points.

The results of the processing of FIG. 5 are data representative of a wave front pattern in which the amplitude values at equal travel times are spread through the coordinate system of the spread of traces along an elliptical arc 14, as shown in FIG. 5, which may be imagined as the propagating wave front, and which are the locus of all possible impedance discontinuities which contribute to the acoustic energy returned at the travel time on the respective input traces $S_1R_2$–$S_1R_4$. The scaled wave front pattern that is produced in the half space from the center point out to the position assigned to trace $b_n$ is that described in the above referenced Rockwell patent. The trace spreads 23a–23c also have the characteristic illustrated in FIG. 6. For any given depth Z, each of the traces $S_1R_2b_0$–$S_1R_2b_n$, for example, will have an amplitude value equal to the amplitude value on input trace $S_1R_2$ at the travel time required for acoustic energy to travel from the shot point $S_1$ to the particular depth point Z at the station for the respective trace $S_1R_2b_0$–$S_1R_2b_n$ and return to the receiver $R_2$.

As previously mentioned, each of the input traces $S_wR_2 S_xR_x$ is processed in the same manner to produce a spread of vertically corrected traces $S_wR_xb_0$–$S_wR_xb_n$, with the subscript w being the shot point number and the subscript x the receiver number of the input trace. The station assignments of these traces are shown in FIG. 7 where the numbers within the table are the subscript y in the trace designation $S_wR_xb_y$. It will be noted that the trace spreads $S_1R_1b_y$–$S_1R_5b_y$ are centered at stations 91–95, respectively, that the trace spreads $S_2R_1bay$–$S_2R_5b_y$ are centered at stations 89–93, respectively, and that the trace spreads $S_3R_1b_y$–$S_3R_5b_y$ are centered at stations 87–91, respectively. Conversely, it will be noted that a large number of the traces $b_x$ are assigned to each of the stations. For example, traces $S_1R_1b_1$, $S_1R_2b_s$, $S_1R_3b_3$, $S_1R_4b_4$, $S_1R_5b_5$, $S_2R_1b_1$, $S_2R_2b_0$, $S_2R_3b_1$, etc. are assigned to station 90. Of course, that portion of the table shown in FIG. 7 includes but a small portion of the total number of traces for the respective stations.

In accordance with the broader aspects of the invention, the amplitude values at the successive depth points of all or a portion of the traces $S_wR_xb_y$ at each station are combined to produce the values at the corresponding depth points at the respective stations of the composite data image illustrated in FIG. 1. Another aspect of this invention is concerned with the manner in which the amplitude values of traces $S_wR_xb_y$ are combined to produce the coordinate amplitude values of the composite data image. Combination of the amplitude values is achieved by sector selection as represented by blocks 24a–24c, 26a–26c and 27a–27c in FIG. 3.

Consider first the processing of the data contained by the traces $S_wR_xb_y$ in such a manner as to enhance spectral reflectors. Referring to FIG. 5, for example, it will be recalled that the amplitude value at travel time $T_i$ on an input trace, trace $S_1R_3$, for example, is spread in an elliptical arc in traces $S_1R_3b_0$–$S_1R_3b_n$ which is the locus of all possible structures causing the acoustic return at that time. Assuming that the acoustic return is in fact caused by a spectral reflector, the spectral reflector can be located only on a tangent to the arc, such as might be the case for spectral reflector 30 which is tangent to the arc at coordinate point 32. The summation of the amplitude value produced by the reflector at point 32 into the composite image at all other coordinate points along the arc is a falsity and therefore a form of noise. This invention is concerned with reducing or eliminating this form of noise.

A large portion of seismic data which will be processed in accordance with the present invention will relate to geological areas in which the general dip range of the spectral reflectors is known. When this is the case, a large portion of the noise resulting from the erroneous placement of the amplitude values can be eliminated by properly selecting the traces $S_wR_xb_y$ to be combined at the various coordinate points of the data image. For example, assume that all spectral reflectors in the region have a dip angle between 0°, as represented by reflector 34 in FIG. 8, and that angle represented by reflector 36. In such a case, the sector selection program 24 would be programmed to select only traces $S_wR_xb_0$–$S_wR_xb_4$ from each spread of traces 23a–23c at the depth of reflector 34. At the depth corresponding to reflector 38, the sector selection program 24 would select only traces $S_wR_xb_0$–$S_wR_xb_7$ from each spread of vertical traces $S_wR_xb_0$–$S_wR_xb_n$. It will be noted that the same traces are selected from each spread so that each of the programs 24a–24c are identical. It will also be noted that the sector selection program tapers so that the number of traces selected increases with depth in order to include information returned from reflecting horizons within a constant dip range. If the dip range of the reflecting horizons for given depth is known within narrow limits, the number of traces selected for inclusion in the composite image for that depth may be small. Normally, a larger number of traces will be included as the depth increases.

The sector selection program 24 may also be used to enhance diffractors or source scatterers. In general, returns from spectral reflectors have a greater amplitude than returns from diffractors because of the focused nature of reflected energy. Accordingly, the sector selection program 24 may be used in the converse manner to that described for picking spectral reflectors to enhance diffractors. That is, instead of including only those traces $S_wR_xb_y$ which potentially contain energy returned from known reflecting horizons, those traces are excluded, and the remaining traces included in the composite image display. Such a selection would include only the energy returned from diffractors, which will be summed to image the diffractor, and the random noise produced by the erroneous placement of the returns from certain reflectors will tend to cancel.

Also, the sector control program 24 may be such as to progressively weight the amplitude values upwardly or downwardly as the traces $S_wR_xb_y$ in accordance with the distance of the respective trace from that trace which represents the center of the known dip range of interfaces within the geological region being investigated. For example, when searching for reflectors in the dip range of interest assumed in FIG. 8, the amplitude values of traces $S_wR_xb_2$ would be given maximum weight for depth 34, with the amplitude values of adjacent traces having progressively decreasing weights to both the right and left. At the depth of reflection 38, the amplitude values of traces $S_wR_xb_3$ and $S_wR_xb_4$ might be given maximum weight with amplitude values of adjacent traces being progressively decreased on a relative scale. Conversely, in a search for diffractors in the geological region having specular reflectors within the dip range illustrated in FIG. 8, the amplitude values at depth 34 of trace $S_wR_xb_2$ might be given a minimum weight, with adjacent traces being progressively increased in weight, and at depth 38, and traces $S_wR_xb_3$ and $S_wR_xb_4$ would be given the minimum value, with the adjacent traces being progressively increased in value.

Figure 9:
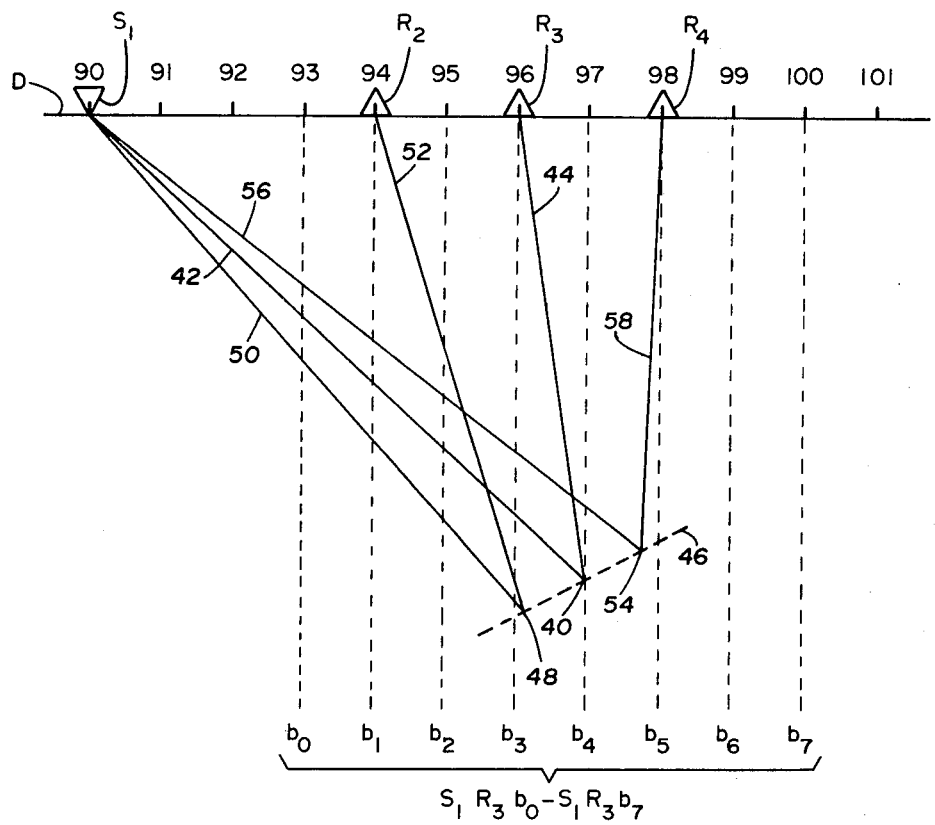
FIG. 9 is a schematic diagram illustrating the method of automatic sector selection by correlation gain in the method of FIG. 3.
Figure 9A:
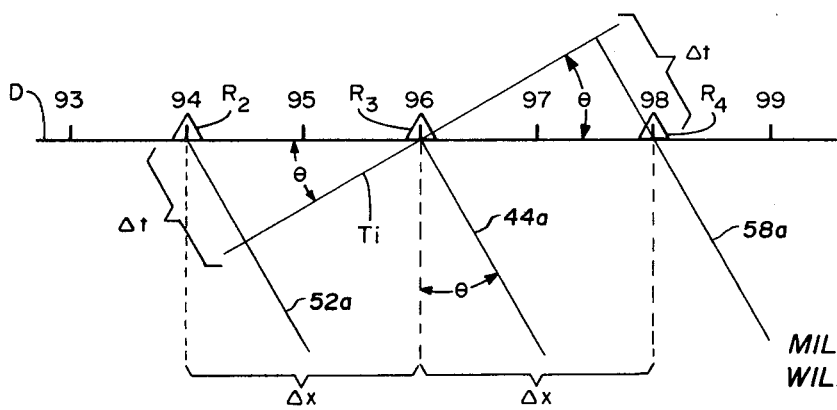
FIG. 9a is a schematic diagram illustrating a method for determining correlation gain in the sector selecting step of FIG. 9.

Sector selection can be automatically achieved by applying the correlation gain program for reflectors represented by the block 26. Consider the processing of traces $S_1R_3b_0$–$S_1R_3b_n$ as illustrated in FIGS. 9 and 9a, and in particular assume that the amplitude value of trace $S_1R_3b_4$ at point 40 is being processed. It is known that the energy originated at shot point $S_1$, station 90, and was detected at receiver $R_3$, station 96. The amplitude value stored at point 40 on trace $S_1R_3b_4$ is the amplitude on input trace $S_1R_3$ at the travel time corresponding to the time required for acoustic energy to travel from shot point $S_1$ to point 40 in the coordinate grid system and return to receiver $R_3$, i.e., generally along path 42–44. Given this geometry, energy would be returned from a specular reflector only if the specular reflector were lying in the position represented by the dotted line 46, with the dip angle such that the angle of incidence of the ray upon the specular reflector equals the angle of reflection. If a specular reflector does in fact lie in the position 46, substantially the same amplitude value would be found on adjacent input traces $S_1R_2$ and $S_1R_4$. The amplitude value would be found on input trace $S_1R_2$ at the travel time required for energy to travel from shot point $S_1$ to point 48 and return to receiver $R_2$, as represented by path 50–52, and the amplitude value would be found on trace $S_1R_4$ at the travel time required for acoustic energy to travel from shot point $S_1$ to point 54 and return to receiver $R_4$, as represented by path 56–58. A correlation gain factor is produced by comparing the amplitude value stored at point 40 on trace $S_1R_3b_4$ with the selected amplitude values on the collateral input traces $S_1R_2$ and $S_1R_4$. The amplitude value stored at 40 on trace $S_1R_3b_4$ is then modified in accordance with the correlation gain factor as will hereafter be described.

The derivation of the travel time on the collateral input traces $S_1R_2$ and $S_1R_4$ is represented by the blocks 60b and 62b in FIG. 3. It will be noted that the input trace $S_1R_4$ is applied to block 60b, as represented by line 64, and that input trace $S_1R_2$ is applied to block 62b, as represented by line 66. A preferred method for determining the sample time on the collateral input traces $S_1R_2$ and $S_1R_4$ is illustrated in FIG. 9a. If the vertical distance to point 40 is large compared to the spacing between the receiver for the input trace $S_1R_3$ and the receivers for the collateral input traces $S_1R_2$ and $S_1R_4$, the approximation illustrated in FIG. 9a can be used advantageously. In FIG. 9a it is assumed that the ray paths for the wave energy returning along paths 44, 52 and 58 are parallel, as represented by lines 44a, 52a and 58a. The emerging angle of ray 44a, angle $\theta$, is known from the positions of point 40 relative to station 96. From simple geometry, the difference in travel time $\Delta t$ for the returning energy to receivers $R_2$ and $R_4$ as compared to receiver $R_3$ may be computed from the simple equation $\Delta t = (\Delta x \sin \theta / V)$, where V is the appropriate velocity value. Therefore, the amplitude value stored at point 40 on trace $S_1R_3b_4$, which is the amplitude value stored at time $T_i$ on input trace $S_1R_3$, is compared to the amplitude value at time $T_i-(\Delta t)$ on collateral trace $S_1R_2$ and to the amplitude value at time $T_i + (\Delta t)$ on collateral trace $S_1R_4$ to provide a correlation gain factor. In the example illustrated, the $\Delta t$ value is negative. The value at point 40 on trace $S_1R_3b_4$ is then multiplied by the correlation gain factor.

The correlation gain factor can be computed in any suitable manner. For example, the amplitude values of all three numbers may be summed algebraically, then divided by the value at point 40 to produce the correlation gain factor. This has the effect, when multiplied with the amplitude value of substituting the sum of the three amplitude values for the amplitude value at point 40. Alternatively, if the three amplitude values have the same sign, the two amplitude values derived from the collateral traces can be multiplied to provide the correlation gain factor which can be a positive value so that the proper sign will be retained for the amplitude value at point 40 after multiplication by the gain factor. If the sign of one of the values is different, the values may be summed algebraically and averaged to provide the correlation gain, or any other procedure to weight down the amplitude value at point 40. Any other conventional correlation technique, such as cross correlation over a short time span, may be used to derive a gain factor related to the degree of correlation between the selected amplitude values. Although only two collateral input traces were used in the example, it will be understood that it will usually be desirable to use a larger number such as four or six.

Each point of each of the traces $S_1R_3b_0$–$S_1R_3b_n$ is individually processed in accordance with the correlation gain procedures of program 26b. The resulting traces are designated as $S_1R_3c_0$–$S_1R_3c_n$ as indicated by block 27b in FIG. 3. Each of the other spreads of traces $S_wR_xb_0$–$S_wR_xb_n$ are processed by the correlation gain procedure to produce spreads of traces $S_wR_xc_0$–$S_wR_xc_n$, such as represented by blocks 27a and 27c. In this processing, input traces $S_1R_1$ and $S_1R_3$ would be collateral traces to the trace spread $S_1R_2b_0$–$S_1R_2b_n$ and input traces $S_1R_3$ and $S_1R_5$ would be collateral traces to trace spreads $S_1R_4b_0$–$S_1R_4b_n$.

As mentioned, the traces $S_wR_xb_0$–$S_wR_xb_n$ can also be processed in accordance with the program represented by block 28 to automatically select sectors to enhance diffractors. Consider now, FIG. 10 which illustrates processing of traces $S_1R_3b_0$–$S_1R_3b_5$ which are illustrated at the respective assigned stations 93–98, respectively. Assume that the coordinate depth point 70 on $S_1R_3b_2$ is being processed for correlation gain. The amplitude value stored at point 70 is the amplitude value on input trace $S_1R_3$ at the travel time acquired for acoustic energy to travel along path 72 from shot point $S_1$ to the point 70, and then along path 74 to receiver $R_3$. If a diffractor does in fact exist at point 70, substantially the same amplitude value would appear on collateral input trace $S_1R_2$ at the travel time required for energy to travel path 72 to coordinate 70 and return on along path 76 to receiver $R_2$. Similarly, the same amplitude value should appear on collateral input trace $S_1R_4$ at the travel time required for energy to travel path 72-78 from source $S_1$ to coordinate 70 and then to receiver $R_4$. Accordingly, a correlation gain factor can be produced by comparing the amplitude values on the three traces $S_1R_2$, $S_1R_3$ and $S_1R_4$ at the respective travel times, and then multiplying the amplitude value at point 70 on trace $b_2$ by the correlation gain factor. The correlation gain factor can be computed from the selected amplitude value as heretofore described in connection with the procedure 26a–26c. The travel times on the collateral traces $S_1R_2$ and $S_1R_4$ for paths 72–76 and 72–78 have been calculated directly from Equation (1). Also, certain approximations of the type illustrated in FIG. 9a are valid for certain geometries. If the traces $S_1R_2b_0$–$S_1R_2b_n$ and $S_1R_4b_0$–$S_1R_4b_n$ have already been compiled, the travel times may be picked from the corresponding depth points on traces $S_1R_2b_3$ and $S_1R_4b_1$. The amplitude value stored at point 70 on trace $S_1R_2b_3$ was that amplitude value on collateral input trace $S_1R_2$ at the travel time 72–76. Similarly, the amplitude value stored at depth point 70 on trace $S_1R_4b_1$ was the amplitude value at travel time on collateral input trace $S_1R_4$ corresponding to path 72–78. Accordingly, for correlation gain processing 28b, the appropriate amplitudes from spread $S_1R_2b_0$–$S_1R_2b_n$ can be obtained from block 23a, as represented by line 80 in FIG. 3, and the appropriate amplitudes from spread $S_1R_4b_0$–$S_1R_4b_n$ can be obtained from block 23c as represented by line 82. These values may then be compared to produce the correlation gain factor to be multiplied with the amplitude value on trace $S_1R_3b_2$ at depth point 70 to produce the values at depth point 70 for trace $S_1R_3d_2$. This procedure is repeated for all points on traces $S_wR_xb_0$–$S_wR_xb_n$ to produce a spread of traces $S_wR_xd_0$–$S_wR_xd_n$ for each input trace $S_wR_x$.

Figures 10, 12:
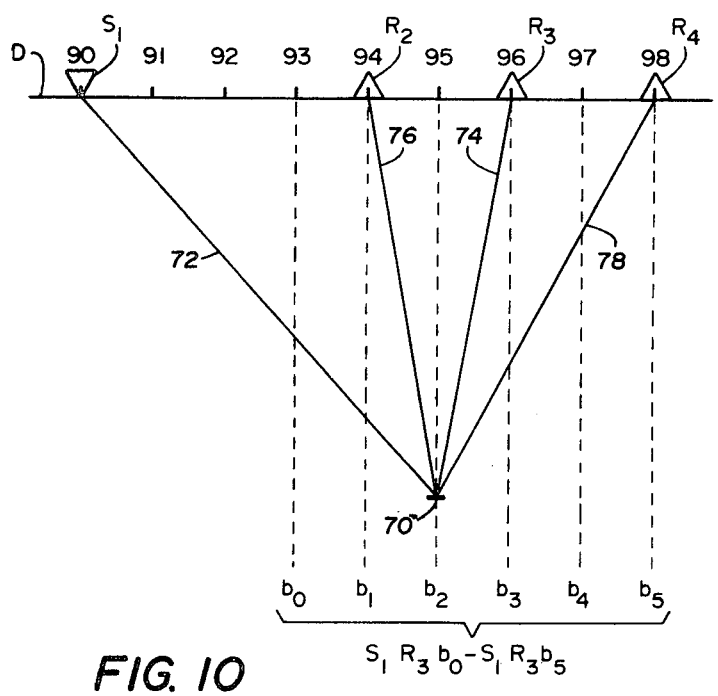
FIG. 10 is a schematic diagram illustrating sector selection by automatic correlation gain for diffractors in the method of FIG. 3.
FIG. 12 is a table illustrating the manner in which traces are collated at the respective stations in the method of FIG. 11.

It is important to note that a diffractor at a point, such as point 70 in FIG. 10, theoretically distributes energy in all directions. Accordingly, if an ideal diffractor did exist at the depth corresponding to point 70 at interval 95, the same amplitude value would exist on all the traces in table 7 assigned to interval 95 at the same depth point. Accordingly, the amplitude values at the corresponding depth points on all, or a large portion, of the $S_wR_xb_y$ traces assigned to interval 95 can be compared for correlation, if desired.

The output traces selected by the sector selection program 24a–24c, which are the traces $S_wR_xb_y$ in blocks 25a–25c, may be directly combined to produce the composite image, which step is represented by block 30. This step involves merely algebraically summing the amplitude values of the selected traces assigned to each station as set out in the table of FIG. 8 at corresponding coordinate depth points. Or the traces $S_wR_xc_y$ in blocks 27a–27c or the traces $S_wR_xd_y$ in blocks 29a–29c may be combined in the same manner to produce the composite data image. The data image may then be displayed or further processed in any desired manner.

Figure 11:
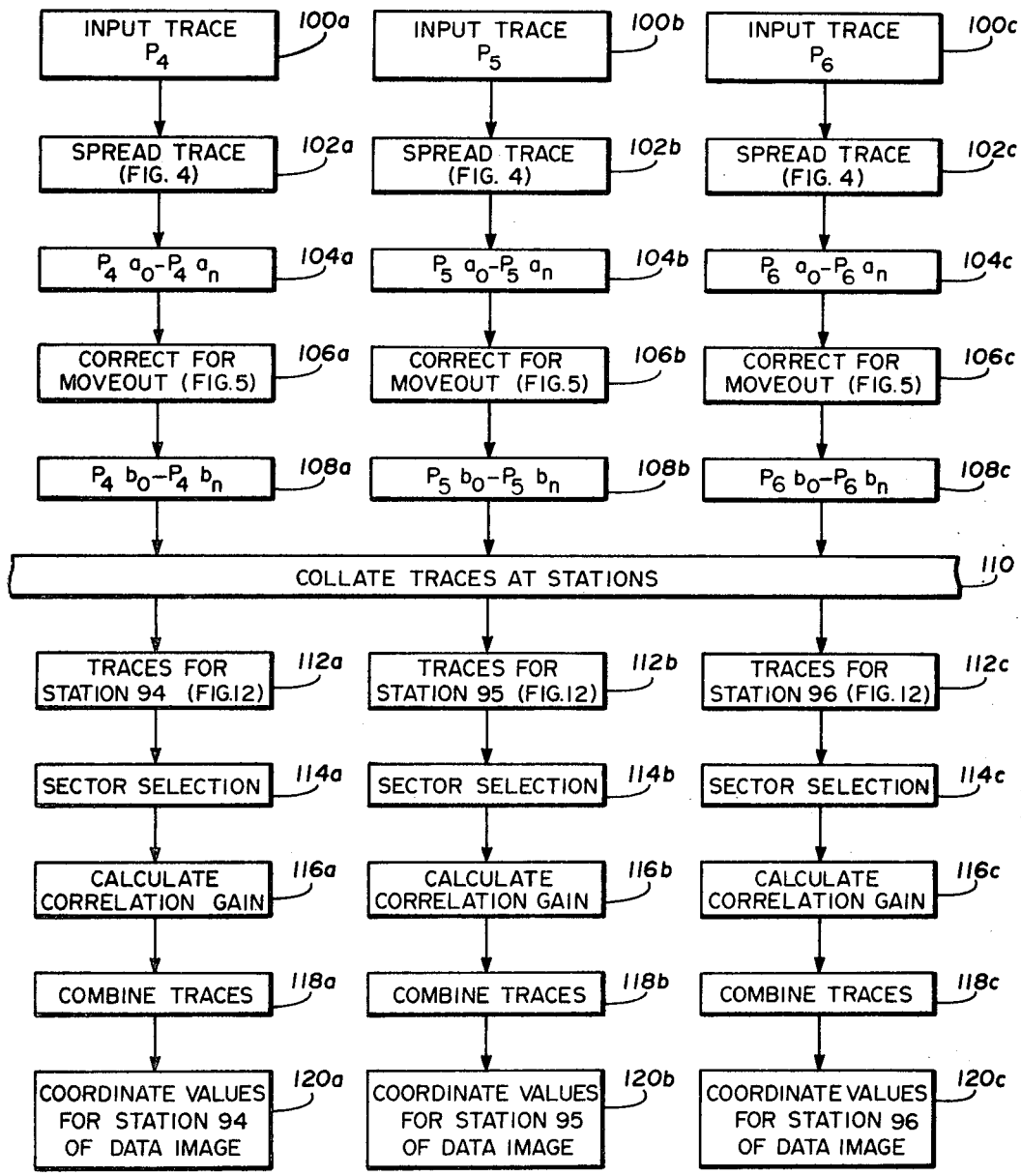
FIG. 11 is a block diagram of another embodiment of the method of the present invention.

Another embodiment of the invention is illustrated in the schematic block diagram of FIG. 11. The input traces $S_wR_x$ to the embodiment of FIG. 3 can also be the input traces to the embodiment of FIG. 11. However, as previously mentioned, the input traces to either of the methods of the invention can also be common-depth-point stacked traces, which are selected as the input traces in FIG. 11, which are designated as input traces $P_4$, $P_5$ and $P_6$. Input trace $P_4$ is, for example, the trace resulting from common depth point stacking of the traces gathered in accordance with FIG. 2 which have source receiver pairs centered about station 94. For example, traces $S_1R_4$, $S_2R_6$, $S_3R_8$, etc. would be stacked to produce input trace $P_4$. Similarly, traces $S_1R_5$, $S_2R_7$, $S_3R_9$, etc. would be stacked to produce input trace $P_5$. Input trace $P_6$ would be produced by stacking those traces having source receiver pairs centered about station 96, which would include trace $S_1R_6$, $S_2R_8$, $S_3R_{10}$, etc. The stacking procedure in effect corrects each of the traces for normal moveout, and then sums the traces to produce a single trace in which the signal-to-noise ratio is enhanced. A common depth point stacked trace also has the characteristic of being theoretically equivalent to locating both the shot point and receiver at the common depth point.

In FIG. 11, the input traces $P_4$, $P_5$ and $P_6$ are represented by blocks 100a, 100b and 100c, respectively. Each of the input traces is spread in the manner illustrated in FIG. 4, as is represented by blocks 102a, 102b and 102c. This produces sets of traces $P_4a_0$–$P_4a_n$, $P_5a_0$–$P_5a_n$ and $P_6a_0$–$P_6a_n$ as represented by blocks 104a, 104b and 104c, respectively. Next the traces in blocks 104a–104c are corrected for moveout as indicated by blocks 106a–106c. This procedure may be substantially identical to that described in FIGS. 5 and 6, except that both the source and receiver points for each trace are located at the same station, which for traces $P_4$–$P_6$ are stations 94-96. This processing produces traces $P_4b_0$–$P_4b_n$, $P_5b_0$–$P_5b_n$ and $P_6b_0$–$P_6b_n$ as indicated in blocks 108a–108c. The traces in blocks 108a–108c preferably have vertical intervals corresponding to the vertical intervals of the coordinate points of the data image shown in FIG. 1. For purposes of the following discussion, it will be assumed that the vertical intervals are depth intervals, although equal time intervals may be used if desired. It should also be understood that the vertical intervals, whether depth or time, may vary in order to provide increased resolution at particular depths of interest.

Next the traces $P_4b_0-P_4b_n$, $P_6b_0-P_6b_n$ and $P_6b_0-P_6b_0-P_6p_n$ are collated as represented by the block 110 so that the traces are compiled at the appropriate stations. This compilation is illustrated in the table of FIG. 12, where the stations are numbered across the top of the table and the traces $P_0b_x-P_{10}b_x$ are illustrated vertically along the left edge. The numbers within the table represent the subscript $x$ for the respective trace designations $P_0b_x-P_{10}b_x$. For example, traces $P_0b_0-P_0b_{10}$ are spread from stations 90 through 100, respectively. Traces $P_0b_0$, $P_1b_1$, $P_2b_2$, etc. through $P_{10}b_{10}$ are at station 90. Blocks 112a, 112b and 112c represent the collection of traces for stations 94, 95 and 96, respectively, as set forth in the table of FIG. 12.

Next a sector selection procedure 114a–114c is applied to the traces collated at the respective stations. After sector selection, the correlation gain factor is calculated at 116a–116c, and the selected and correlation gain processed traces are then combined at 118a–118c to produce the values at the vertically spaced coordinate points oriented under the respective stations 94, 95 and 96 of the data image, as represented by blocks 120a–120c.

Figure 8:
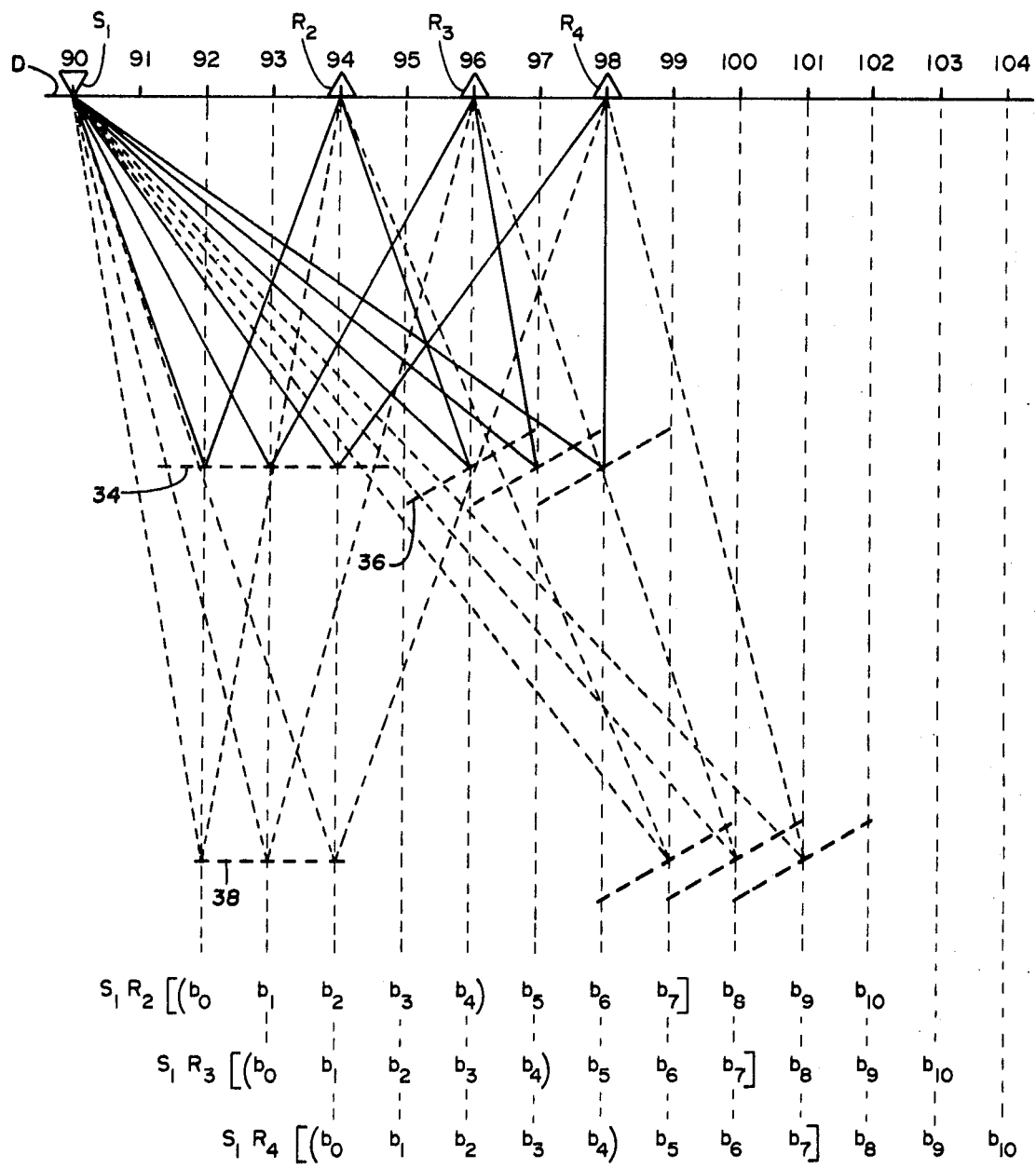
FIG. 8 is a schematic diagram which serves to illustrate the criteria for the step of sector selecting in the method of FIG. 3.

The sector selection procedure 114a–114c may be on a predetermined basis as described in connection with FIG. 8. In such a case, the correlation gain procedure 116a–116c will usually not be employed.

The sector selection procedure 114a–114c may also be used to select those traces, the amplitude values of which are to be processed by the correlation gain procedure discussed in connection with FIG. 10. The correlation gain procedure can then be carried out at 116a–116c. The combination of the sector selection procedure 114a–114c to pick the appropriate traces $P_xb_x$ and the correlation gain procedure to compare the amplitude values for correlation would then comprise an automatic sector selecting method for enhancing diffractors as described in connection with FIG. 10, or reflectors as in FIG. 9.

Figure 13:
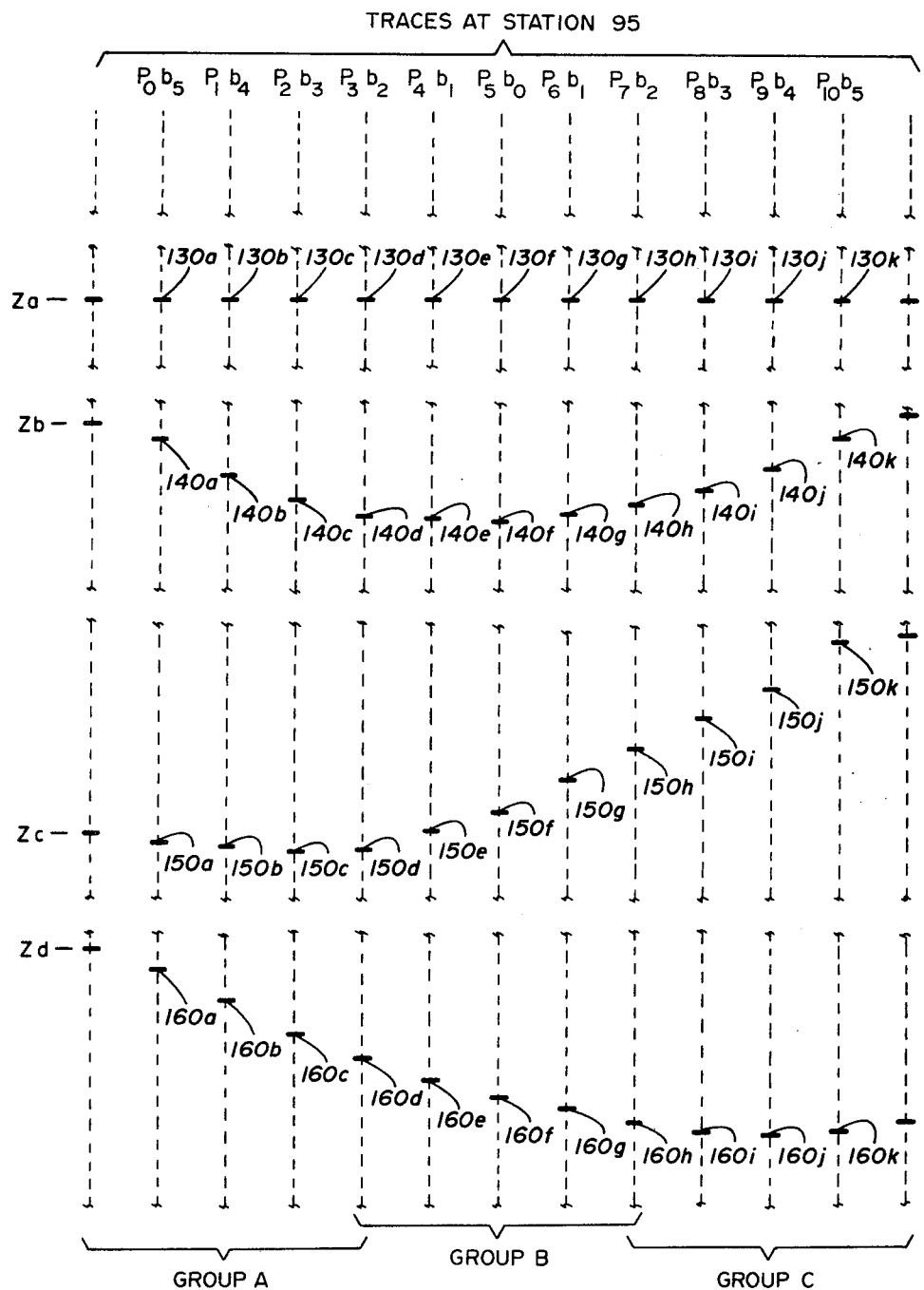
FIG. 13 is a schematic diagram which illustrates specific aspects of the method of FIG. 11.

It is particularly advantageous to print out the traces at the respective stations 94, 95 and 96 as represented by blocks 112a–112c, respectively, in a visual arrangement such as illustrated in FIG. 13. For example, the techniques of producing variable width or variable density traces of the type employed to display a section of common depth point stacked data may be used. Such a display can provide a means for accurately determining the prevalent dip range of reflectors in the geological region of interest, and thus can serve as the means for selecting predetermined traces as discussed in connection with FIG. 8, as will presently be described. FIG. 13 also serves to illustrate a method for automatically applying sector selection and/or correlation gain to the traces $P_xb_x$ assigned to the respective stations as will hereafter be described.

Figure 14:
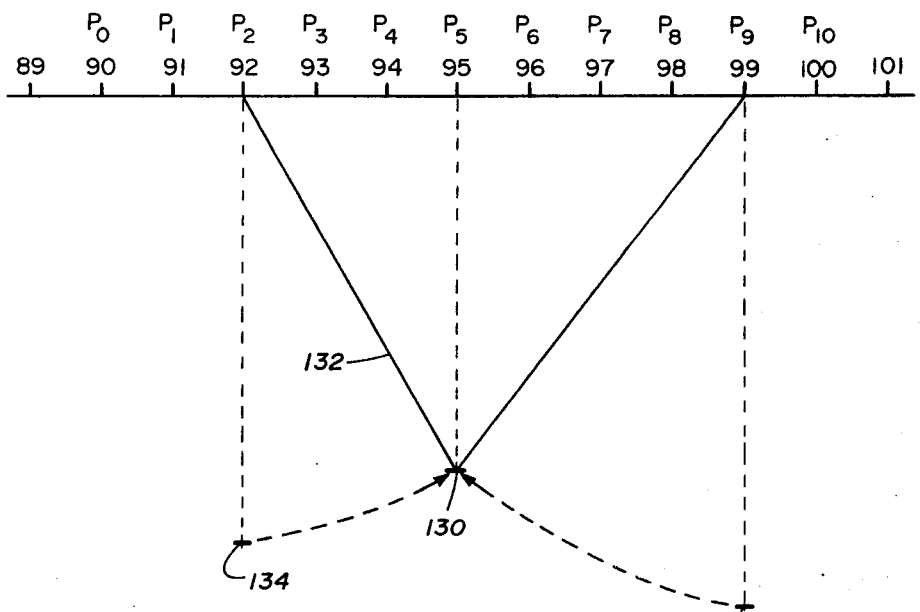
FIGS. 14–17 are schematic diagrams which illustrate how the data displayed in FIG. 13 is interpreted.

FIG. 13 depicts the traces which have been collated with respect to station 95, which are those represented in block 112b of FIG. 11, and which are indicated under station 95 in the table of FIG. 12. Assume that a high amplitude value occurs at depth $Z_a$ on all the traces, as represented by points 130a–130k. The occurrence of the high amplitude points 130a–130k at the same coordinate depth points on all of the traces indicate that a diffractor is located at the depth $Z_a$ at station 95 as illustrated in FIG. 14 by the point 130. This can be seen by recalling that the amplitude value 130 occurred at a travel time on input trace $P_2$, and thus on trace $P_2b_3$. When the trace $P_2a_3$ was corrected for moveout, the point 134 was moved to point 130, which is defined by the diagonal path 132 on trace $P_2b_3$. Similarly, the amplitude value at 130 on trace $P_9b_4$ was derived by transferring the amplitude value from apparent position 136 on the input trace $P_9$ to point 130 on trace $P_9b_4$. Thus, it will be evident that the diffractor 130 will result in substantially the same amplitude value at the common depth $Z_a$ of all traces assigned to station 95. However, the amplitude value will be attenuated for the traces $P_xb_y$ having higher subscript numbers $y$ because of the increased length of the travel path of the energy. Of course, this is an idealized presentation based upon a point source diffractor. In such a case, all traces at station 95 can be compared for correlation as heretofore described.

Figure 15:
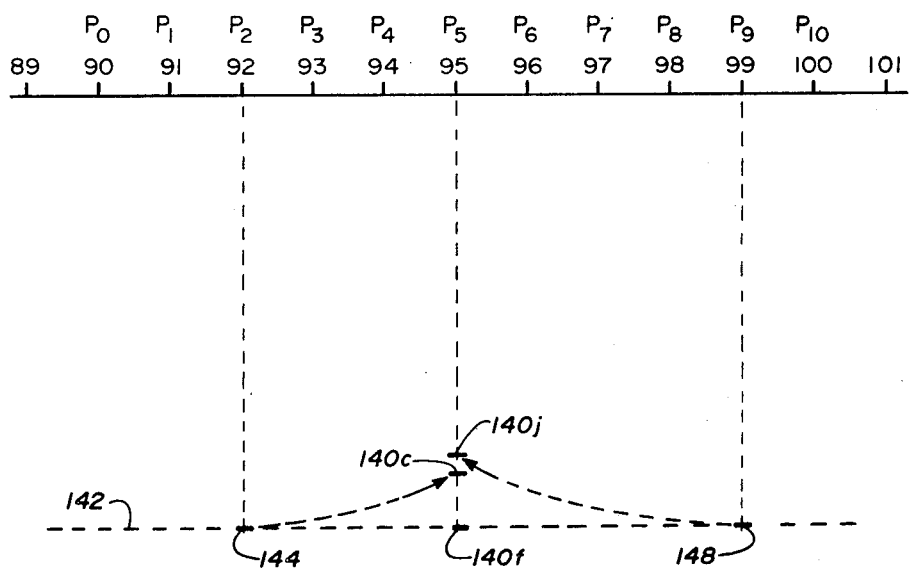

Now consider a pattern of amplitude values 140a–140k in FIG. 13. Again the points 140a–140k represent amplitude values of substantially the same magnitude and polarity. This pattern of values indicates that a reflecting horizon is located at depth $Z_b$, and that the reflecting horizon has zero dip as illustrated by the interface 142 in FIG. 15. Since the reflecting interface 142 is horizontal, the high amplitude returns from the reflecting bed will occur at the same travel times on each of the input traces $P_0-P_{10}$. However, in the compilation of the traces $P_xb_x$ shown in FIG. 13, the amplitude values at these travel times are migrated to a shorter travel time on the respective traces as shown in FIG. 15. For example, the amplitude value on trace $P_2$ reflected from point 144 on interface 142 is migrated to point 140c on trace $P_2b_3$ which is assigned to station 95. The amplitude value on input trace $P_9$ reflected from point 148 is migrated to point 140j on trace $P_9b_4$, which is assigned to station 95. The amplitude value at point 140f on trace $P_5b_0$ is at the correct depth of the interface 142. It will be noted that the amplitude value at point 140f is the deepest of the values in the pattern.

Now consider the pattern of amplitude values 150a–150k of FIG. 13, which are assumed to be of substantially the same magnitude and sign. These amplitude values indicate the presence of the reflecting interface 152 in FIG. 16. The deepest amplitude value 150c on trace $P_2b_3$ indicates the depth of the interface at station 95. Since the ray path from the source of the energy for trace $P_2b_3$ is located at station 92, the dip of the interface is known to be normal to the ray path 153 extending from station $P_2$ to the depth point of the amplitude value 150c beneath station 95. The points from which the high amplitude values 150a, 150f and 150j for traces, $P_0b_5$ and $P_9b_4$ were reflected from the interface 152 are indicated at 154, 155 and 156, respectively, in FIG. 16.

Figure 17:
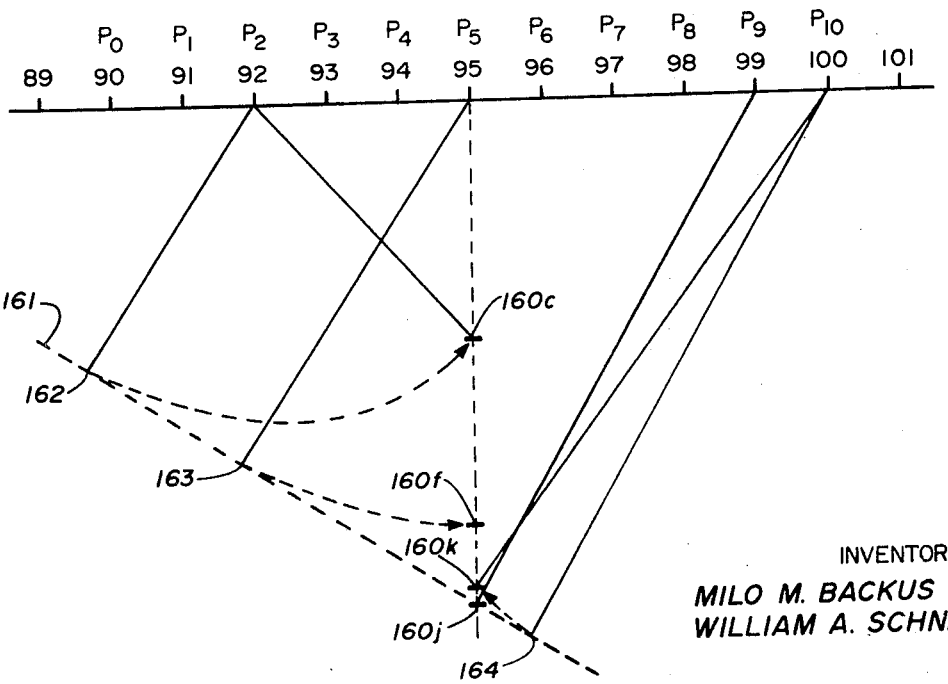

The pattern of high amplitude values 160a–160k in FIG. 13 indicates a spectral reflector located at position 161 in FIG. 17. The lowest point 160j on trace $P_9b_4$ locates the depth of the reflector 161 at station 95. The interface 161 is disposed normal to the ray path from point 160j to station 99, the source-receiver point of input trace $P_9$. The origins of the high amplitude returns 160c, 160f and 160k are shown at 162, 163 and 164, respectively, and illustrate how the pattern of high amplitude values 160a–160k were formed.

Figure 16:
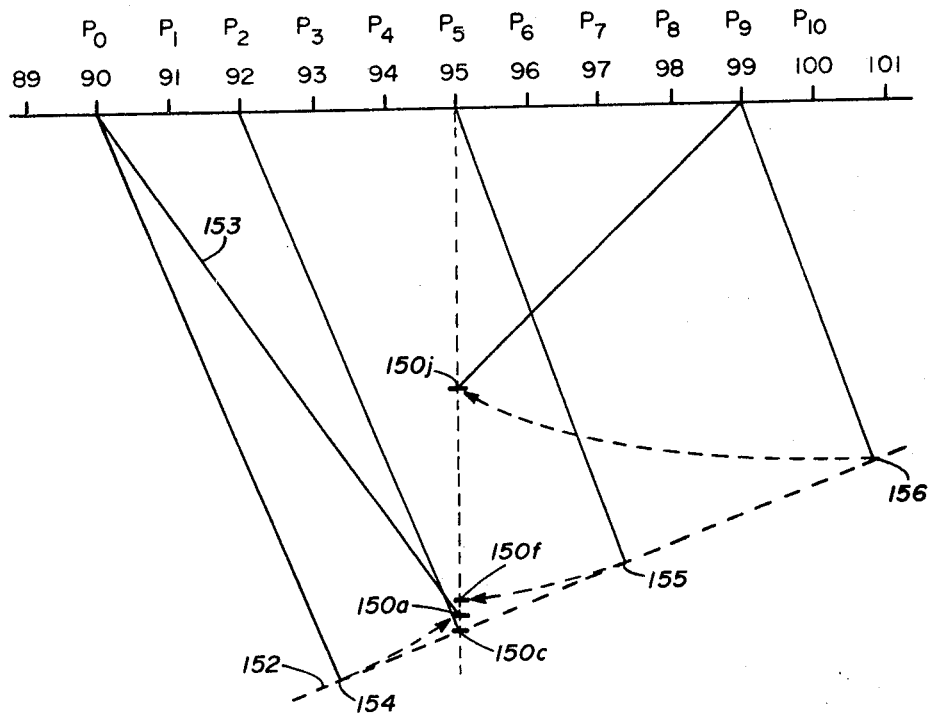

The printout of the traces in FIG. 13 can be very useful to an analyst in determining the dip range at the various depth points beneath a particular station, station 95 for example. From observation of the printout of FIG. 13, the operator can determine which of the traces should be combined to produce the coordinate points at station 95 of the final data image. The same selection will usually be applicable to traces at adjacent stations as well. Of course, any of the traces may be properly combined to show the diffractor 130 in FIG. 14. However, only the traces of Group B would properly be included for the generally horizontal reflecting interfaces, while the traces in Group A would properly be selected for interfaces dipping as illustrated in FIG. 16, and the traces in Group C for interfaces dipping as illustrated in FIG. 17. It will be noted that this selection is consistent with the selection of traces previously discussed in connection with the sector selection in FIG. 8. However, the printout of FIG. 13 provides a means for determining the dip at the particular station and within a particular depth interval from the data itself without any previous knowledge of the geological structure being mapped.

In accordance with another important aspect of the invention, it will be appreciated that the traces assigned to a particular station, such as the traces for station 95 illustrated in FIG. 13, can be automatically processed in such a manner as to provide automatic sector selection, or automatic correlation gain merely by identifying the general patterns illustrated in FIG. 13, and then weighting the amplitude values of the respective traces accordingly.

For a given depth and a given station spacing, which need not be uniform or even in a straight line, the precise pattern of the amplitude values from a planar reflector can be determined and the traces scanned at each depth interval for this pattern to locate the bottom most value of the pattern.

Another embodiment of this invention for automatically selecting the appropriate traces for combination in the data image comprises evaluating the degree of correlation between the amplitude values at the corresponding coordinate depth points of the traces and weighting the values in accordance with the degree of correlation, either by selecting or rejecting the amplitude values, or by modifying the amplitude values.

Figure 18:
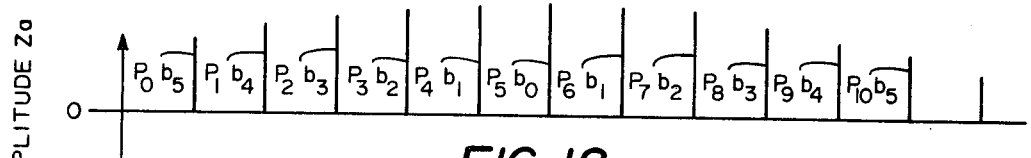
FIGS. 18–21 are schematic diagrams illustrating amplitude profiles of the data displayed in FIG. 13 at depths $Z_a$–$Z_d$, respectively.
Figure 19:
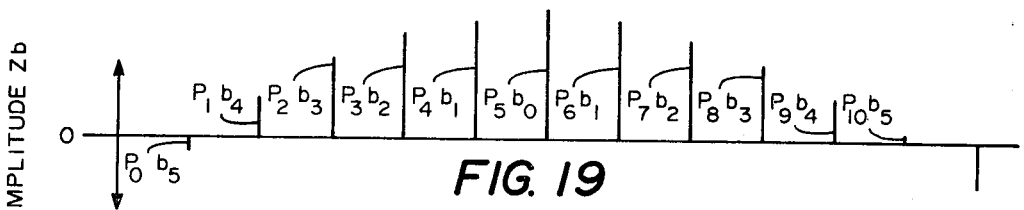
Figure 20:
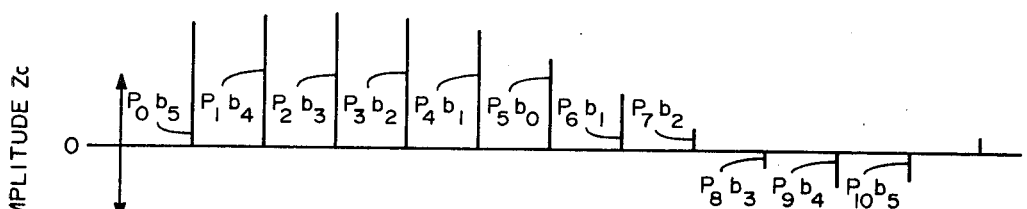
Figure 21:
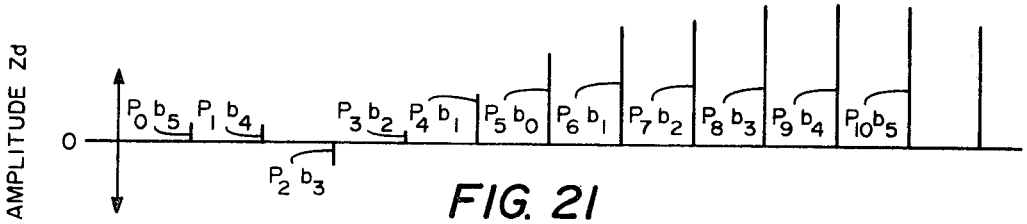

For example, consider the amplitude values 130a–130k at depth $Z_a$, which are disposed in the amplitude profile of FIG. 18. Theoretically, all of the amplitude values would be of equal magnitude and have the same sign, except for attenuation due to the increased lengths of the travel paths for the traces $P_x b_y$ having the higher subscripts $y$. Accordingly, a high degree of correlation should exist, and the combination of these amplitude values should result in a high value at coordinate depth point $Z_a$ under station 95 of the data image, either by including all of the values, or by applying a correlation gain factor as previously described. Next consider the amplitude profile at depth $Z_b$ which is shown in FIG. 19. Because of the general pattern of the points 140a–140k, the amplitude profile at depth $Z_b$ is a maximum at trace $P_5 b_0$, which contains value 140f. As the maximum amplitude values 140a–140k on the other traces move further above depth point $Z_b$, the amplitude values at depth point $Z_b$ of these traces will normally decrease generally as illustrated in FIG. 19. The amplitude profiles at depth points $Z_c$ and $Z_d$ are illustrated in FIGS. 20 and 21, respectively.

One simple means of automatically selecting the appropriate traces to be included in the composite data for a given coordinate depth is to perform conventional calculation to determine the power content of the traces in Group A, the power content of the traces in Group B, and the power content of the traces in Group C. Then the group of traces having the greatest power content are selected for inclusion in the composite data image. Such a procedure would select Group B at depths $Z_a$ and $Z_b$, Group A at depth $Z_c$, and Group C at depth $Z_d$.

Figure 22:
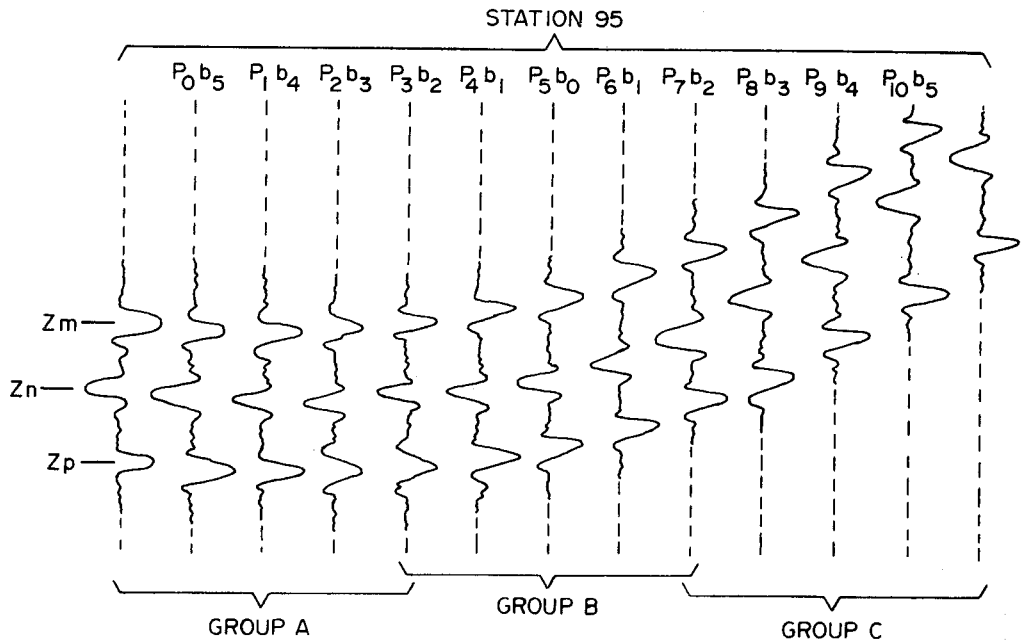
FIG. 22 is a schematic diagram which illustrates advantages of the method of the present invention.

The amplitude profiles of FIGS. 18–21 are idealized and do not readily illustrate why it is desirable to exclude some of the traces, or amplitude values, from the final data image. FIG. 22 illustrates why it is desirable to select only a portion of the traces in a region where specular reflectors predominate. Consider that each of the traces at station 95 is a series of digital values at equally spaced depth increments derived by sampling an analog signal similar to those illustrated. Those skilled in the art will recognize that three separate reflecting horizons are illustrated, and that the pattern is similar to that previously discussed in connection with depth $Z_c$ in FIG. 13. From FIG. 22 it will be noted that only the traces of Group A are the only returns which are validly contributing to the formation of the image of reflector 152 in the region of station 95. The addition of amplitude values at depth $Z_n$ of any of the traces in Groups B and C constitute noise. It will be noted that an adjacent spectral reflector at a lower depth $Z_p$ produces amplitude values in the traces of Groups B and C at depth $Z_n$ which are not properly associated with the interface located at depth $Z_n$ and therefore should not be included when the amplitude values are combined to produce the value for the coordinate point at station 95 and depth $Z_n$ of the composite data image.

Figure 23:
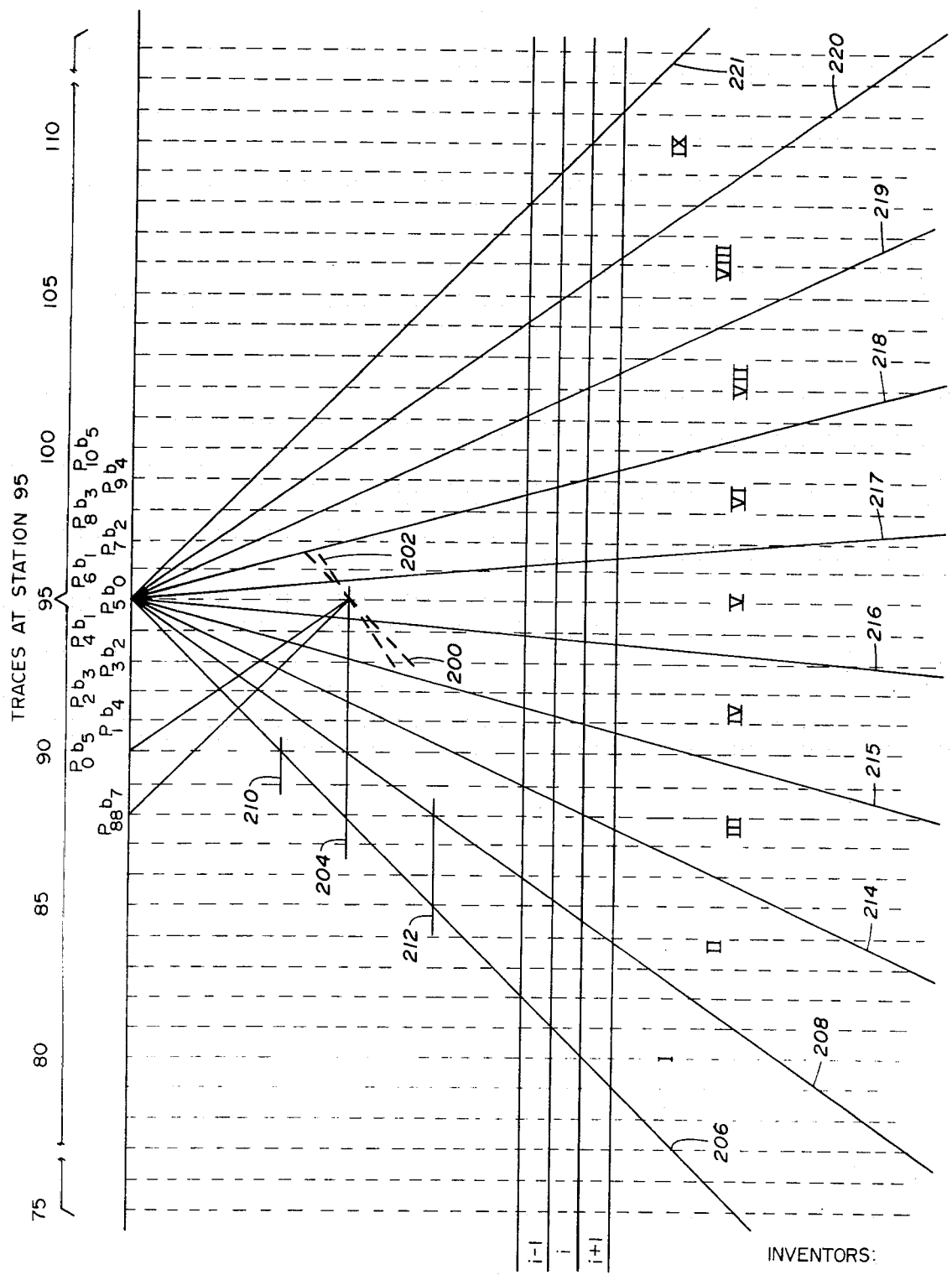
FIG. 23 is a schematic diagram which illustrates another embodiment of the method of the present invention for automatic sector control.
Figures 24, 25:
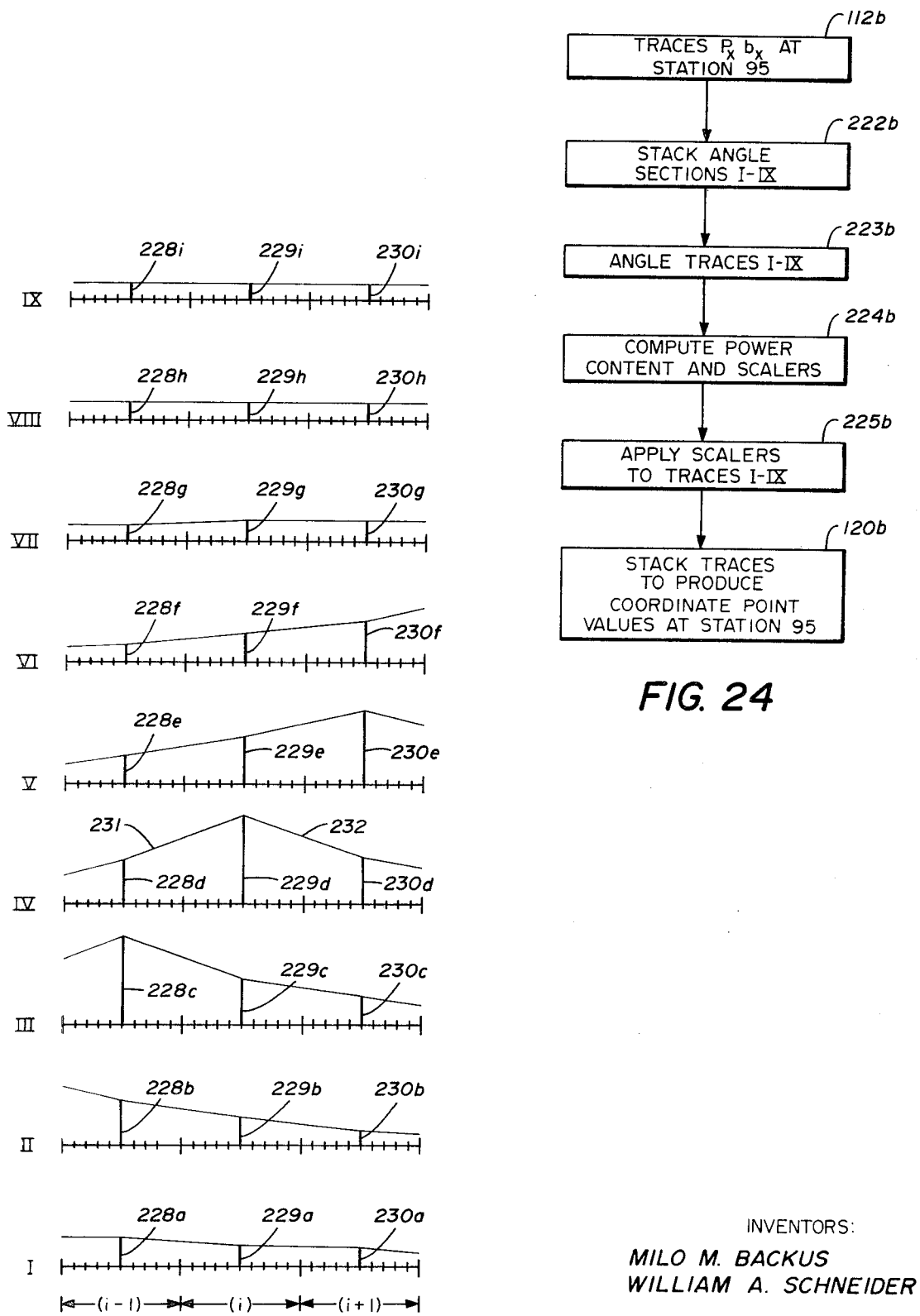
FIG. 24 is a block diagram of the embodiment of the invention illustrated in FIG. 23.
FIG. 25 is a schematic diagram which illustrates one aspect of the embodiment of FIG. 23.

A more sophisticated method for automatically selecting the appropriate traces to be included in the composite data at the coordinate points beneath the particular station, i.e., automatic sector control, is illustrated in FIGS. 23–25. From the discussion of FIG. 8 it will be recalled that in order to maintain sensitivity to reflectors within a given dip range, it is necessary to progressively increase with depth the number of traces which are to be combined into the composite data image at any given station. FIG. 23 illustrates the traces collated at station 95, as represented by block 112b. Each of the traces is imagined as being moved back to the station which is the common depth point, i.e., source-receiver point, for the respective input trace. Thus, trace $P_0 b_5$, for example, is shown illustrated at station 90, which is the station for the input trace $P_0$. From the table of FIG. 12, it will be noted that trace $P_0 b_5$ is positioned at station 95.

Consider now an investigation for the dip range between reflecting interfaces 200 through 202 at a depth 204, as shown in FIG. 23. Energy reflected from the point on interface 202 beneath station 95 would be found only on the input trace at station 90, which is input trace $P_0$. The trace $P_0b_x$ derived from input trace $P_0$ which would contain this information at the depth 204 would be trace $P_0b_5$, which in FIG. 23 is located at station 90. Energy reflected from interface 200 at depth 204 would be found only on the input trace $P_{88}$ for station 88, and this amplitude value would be found at the depth 204 on trace $P_{88}b_7$. Thus, if it is desired to stack the traces assigned to station 95 in the manner to enhance reflectors within the dip range indicated between reflectors 200 and 202, the portions of the traces spread at the various stations in FIG. 23 that lie between lines 206 and 208 which intersect traces $P_{88}b_7$ and $P_0b_5$, respectively, at depth 204 should be included. For example, trace $P_0b_5$ should be included between depth 210 and 204. Trace $P_{88}b_7$ should be included between depth 204 and 212. Stated another way, the amplitude values at depth 204 on traces $P_{88}b_6$ and $P_0b_5$ would be combined to produce the value at the coordinate point under station 95 at depth 204 for the composite data image. As the depth increases, different traces are combined and a greater number of traces are combined to provide the amplitude values for the coordinate points of the data image.

In accordance with another aspect of this invention, the sector selection 114b and correlation gain step 116b in the method of FIG. 11 may be carried out in an automatic manner as represented by blocks 222b–225b in FIG. 24. The traces assigned to station 95 are partitioned into a series of pie-shaped segments as defined by lines 206, 208 and 214–221. Each of these sectors may conveniently be 10° with the result that lines 206 and 221 are disposed at 45° to the surface.

The sectors are designated by the reference characters I–IX. The portions of the traces $P_xb_x$ at station 95 following within the sections I–IX are stacked to produce a set of angle traces I–IX, respectively, as represented at block 223b. This stacking is achieved merely by selecting the amplitude values at a given depth from all of the traces falling within the respective sections, and dividing by the number of values. Any other suitable technique for normalizing or averaging the values can be used. The number of traces for processing is thus reduced from the large number of traces collated at the station 95, typically 96, to the 9 angle traces I–IX.

Next, the power content of each of the angle traces I–IX is computed over a uniform depth interval, or time interval, depending upon the form of the data as represented by intervals $i-1$, $i$ and $i+1$ in FIG. 23. The power computation may involve merely summing the squares of the amplitude values within the intervals. The values representing the power content of each of the traces I–IX in the depth interval are then compared and a scaler value produced for each of the traces I–IX for that depth interval. It is desirable for the sum of the scalers for each interval to be unity, so that the appropriate amplitude values will be retained in final data image.

The scalers are also ramped linearly between the center points of adjacent intervals, as shown in FIG. 25. Assume that the scalers for the interval $i-1$ for the angle traces I–IX are 228a–228i, respectively, the scalers for interval $i$ are 229a–229i, respectively, and the scalers for interval $i+1$ are 230a–230i. The scalers for the respective intervals are applied only to the amplitude values at the depth point at the center of the respective interval, and the scalers are linearly tapered from the value at the midpoint of one interval to the value at the midpoint of the next adjacent interval. For example, consider scalers 228d, 229d and 230d for angle trace IV at intervals $i-1$, $i$ and $i+1$, respectively. The amplitude values at the midpoints of the intervals $i-1$, $i$ and $i+1$ are multiplied by the scaler values 228d, 229d and 230d, respectively. The amplitude values between the midpoints of intervals $i-1$, and $i$ are multiplied by a scaler represented by the line 231. Similarly, the amplitude values of angle trace IV between the midpoint of interval $i$ and the mid point of interval $i$ and the midpoint of interval $i+1$ are multiplied by scalers having values represented by line 232.

After the amplitude values of the angle traces I–IX have been multiplied by the appropriate scalers at each depth point, the values of the nine angle traces I–IX at the respective depth points are then summed to produce the coordinate values at the respective depth points beneath station 95 in the composite data image of FIG. 1, as represented by block 120b in FIG. 24.

In the method of FIG. 24, it is often desirable to process each of the angle traces I–IX from step 223b through 120b without having access to the data in the adjacent angle section. This can be accomplished using the following method. Consider the computation of the scaler $A_{ijk}$ which is to be applied to the midpoint of the $i$th interval of the $j$th angle trace at the $k$th station. The scaler is computed by equation:

$$A_{ijk} = (\Phi_{ijk}/\alpha_{ik}) \qquad (2)$$

where $\Phi_{ijk}$ is a measure of the degree of correlation, such as the power content heretofore described in the $i$th interval of the $j$th trace of the $k$th station, and $\alpha_{ik}$ is equal to $\Phi_{i1k}$. This in effect makes the scaler for angle trace I unity. The value $\Phi_{i1k}$ is stored for each interval.

Each of the scalers $A_{ijk}$ is applied in a linearly varying manner with respect to depth, or time, as previously described in connection with FIG. 25. Thus, the scaler $A_{ijk(n)=}$ which is to be applied to the nth depth point measured from the center of $i$th interval of the $j$th angle trace from the $k$th station is:

$$A_{ijk(n)} = A_{ijk} + n\Delta_{ijk}, \qquad (3)$$

where, $n = 0, 1, 2 \ldots L-1$, $\qquad (4)$ $$\Delta_{ijk} = \frac{A_{i+1, jk} - A_{ijk}}{L} \qquad (5)$$

and L is the number of depth points in the interval measured between the centers of the $i$th and $i+1$th intervals.

As the scalers are computed and applied to the successive amplitude values of each angle trace, the resulting scaled values are added to a partial sum for the respective depth point. The final value for each depth point after the last angle trace for the station has been added in is then multiplied by a recovery scaler to achieve the properly weighted value for the coordinate depth point of the data image at the respective station because the assumption that $a_{ik} = \phi_{i1k} = \Sigma\Phi_{ijk}$ in equation (2) was not valid to produce a unity value for the sum of the scalers $A_{ijk}$ for each depth point. The recovery scaler $R_{ik(n)}$ to be applied to the composite values at the $n$th depth point measured from the center of the $i$th interval of the $k$th station may be expressed as $$R_{ik(n)} = \frac{1}{B_{ik} + n\Delta_{ik}} \quad (6)$$

where: $n = 0, 1, 2, \ldots L-1$ \quad (7)

$$B_{ik} = \sum_j A_{ijk} \quad (8)$$

$$\Delta_{ik} = \frac{B_{i+1,k} - B_{ik}}{L} \quad (9)$$

Application of the recovery scaler results in the values at each coordinate point of the data image at the station being of the proper relative values. This method also permits the complete exclusion of a particular dip range which may include undesirable high amplitude values, such as the amplitude values caused by multiple reflections, as a function of time and station by overriding the program and presetting the scalers $A_{ijk}$ to 0 for the station $k$, the angle trace $j$ and the depth intervals $i$.

Figures 26, 28:
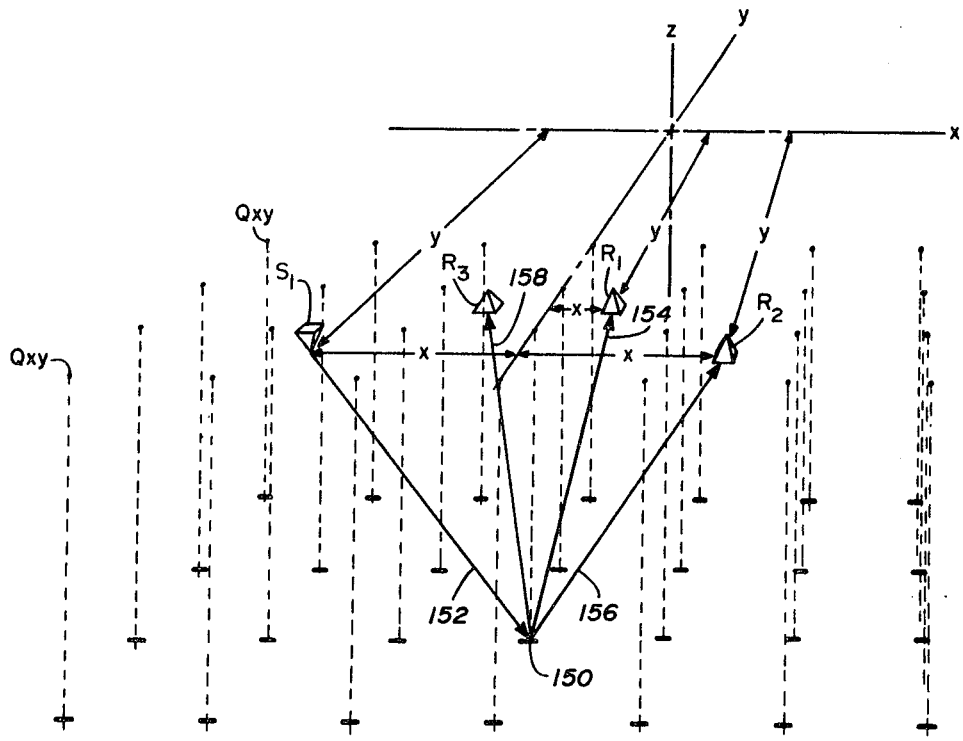
FIG. 26 is a schematic drawing which illustrates application of the method of the present invention to produce a three-dimensional data image.
FIG. 28 is a schematic diagram which illustrates one step of the method as applied to the production of a three-dimensional data image.

As previously mentioned, the method of the present invention can be used to produce a three-dimensional data image of velocity impedance discontinuities of a body. Referring to FIG. 26, assume that a volume is represented by the three-dimensional coordinate system X, Y and Z. Assume that the XY plane is the datum plane approximating the surface of the earth. A plurality of stations $Q_{xy}$ are arranged at coordinate grid points over the XY plane. Assume that acoustic or other wave energy is induced at a shot point $S_1$ and is received at detectors $R_1$, $R_2$ and $R_3$, which are randomly placed relative to the XY plane, but are not in a straight line. Assume also that energy is induced at a large number of other shot points $S_w$ (not illustrated) and that the energy returning from each shot is detected at a number of receivers $R_i$ (not illustrated) disposed randomly on the plane XY so as to provide a large number of input traces $S_w R_i$ each having a different source-receiver location.

The input traces $S_w R_i$ can then be processed as heretofore described to produce a set of traces $S_w R_i b_{xy}$ using equation (1) above. In the expression $S_w R_i b_{xy}$, the subscript $w$ is the shot point, the subscript $i$ is the receiver location, and the subscripts $xy$ are the coordinate locations of the station $Q_{xy}$, to which the trace is assigned. Thus, the set of traces assigned to any station, station $Q_{90}$, for example, would be those traces $S_w R_i b_{90}$ derived from the input traces $S_w R_i$ having shot points and receiver locations within a predetermined distance of station $Q_{90}$.

The traces $S_w R_i b_{90}$ are compiled by computing the travel time from the respective shot point $S_w$ to the successive coordinate depth points at the station, and then to the respective receiver $R_i$. The amplitude values on the input trace $S_w R_i$ at the calculated travel times are the amplitude values of the respective coordinate depth points for the respective traces $S_w R_i b_{xy}$. For example, the value at depth point 150 on trace $S_1 R_1 b_{90}$ is the amplitude value on input trace $S_1 R_1$ at the travel time represented by ray path 152–154. The amplitude value at point 150 on trace $S_1 R_2 b_{90}$ is the amplitude value at the travel time on input trace $S_1 R_2$ represented by ray path 152–156, and the amplitude value at point 150 on trace $S_1 R_3 b_{90}$ is the amplitude value on input trace $S_1 R_3$ at the travel time represented by path 152–158.

The traces $S_w R_i b_{xy}$ at the station $Q_{xy}$ can be processed in any manner heretofore described prior to combination into a composite three-dimensional data image. For example, sector selection as discussed in connection with FIG. 8 can be carried out for both azimuth and dip angle to enhance specular reflectors having a predetermined dip range and azimuthal direction. Or these reflections can be excluded to enhance diffractors.

Automatic sector selection can be achieved by the correlation gain procedures discussed in connection with FIGS. 9, 9a and 10. Three-dimensional correlation gain can be achieved for diffractors by using two input traces in which the sources and/or receivers for the traces are located at three points not in a straight line. Three-dimensional correlation gain for reflectors can be achieved from any three input traces in which the points of reflection from a possible reflection are not in a straight line.

Interpretation for automatic processing of the traces at each station can be carried out as described in connection with FIG. 13. The response for a diffractor will be at the same apparent depth on all traces, as with response 130$d$. The pattern of responses for a specular reflector will define a generally spherical dish with the apparent deepest point defining the dip, and the azimuth of the dip of the reflector at the particular station $Q_{xy}$. The three-dimensional data at each station can also be automatically processed in any manner heretofore described in connection with FIG. 13.

Generally speaking, a three-dimensional image can be constructed in accordance with this invention from input traces derived from a series of shot points and receivers disposed in at least three locations, not in a straight line, so long as the location of the points is known. This permits accurate mapping of subsurface features in areas where it is not practical to employ common depth point data gathering techniques, such as in mountainous areas and at sea. The method can also be used to acoustically map the human body in three-dimensions, acoustically map articles of manufacture in three-dimensions to detect flaws, etc., or map any other solid, liquid, gaseous body or body composed of any combination of the three.

Figure 27:
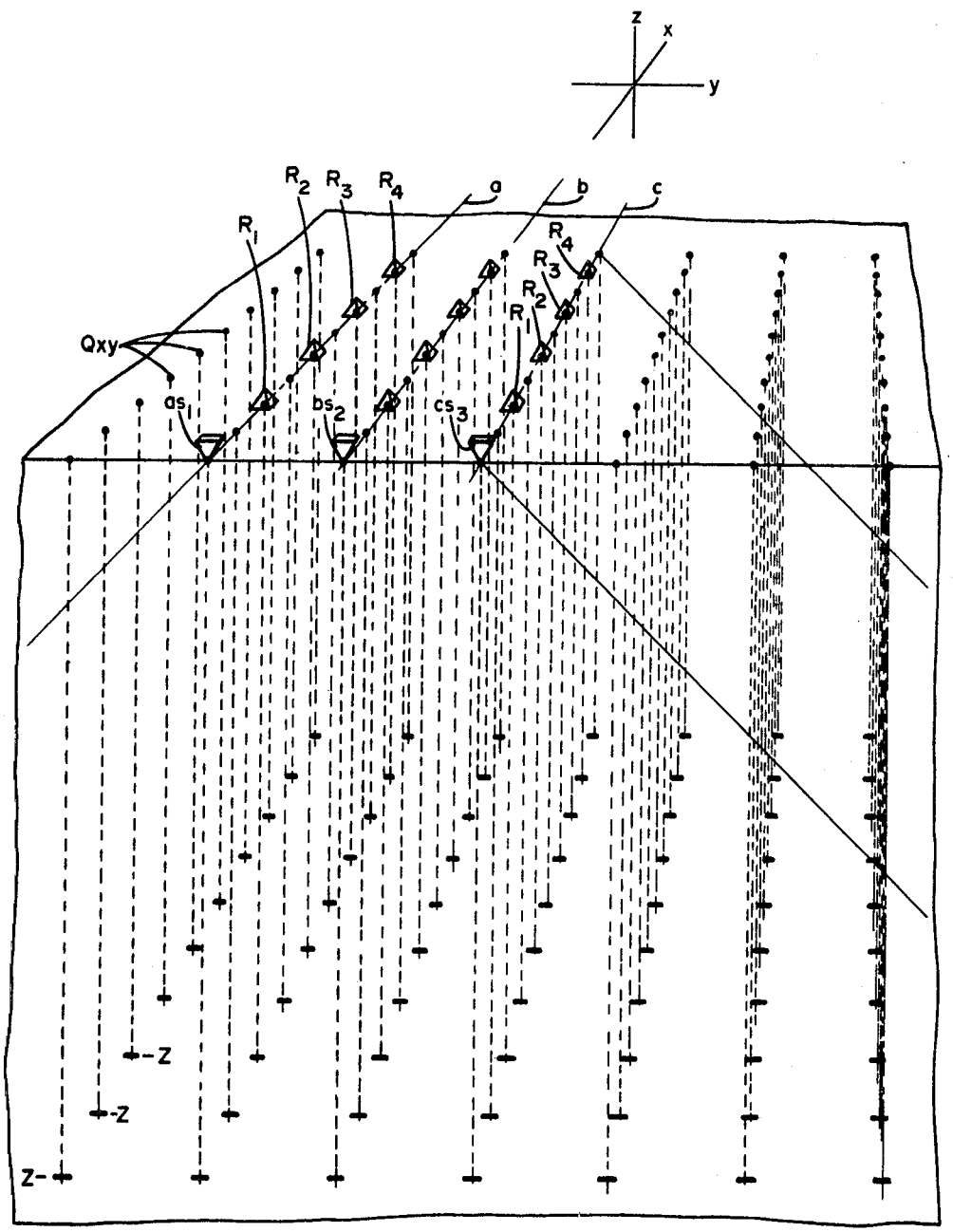
FIG. 27 is another schematic drawing which illustrates the application of the present invention to produce a three-dimensional image from a plurality of sets of common depth point data.

Referring now to FIG. 27, assume that a surface of the earth is represented by a datum plane XY and the volume beneath the surface by the depth Z. Assume that a grid of stations $Q_{xy}$ are assigned at uniform intervals in the X and Y coordinate directions as indicated. Assume also that three sets of common depth point data are collected as described in connection with FIG. 2 along three parallel lines $a$, $b$, and $c$ to produce sets of input traces $[(aS_1R_1 - aS_1R_n) - (aS_nR_1 - aS_nR_n)]$, $[(bS_1R_1 - bS_1R_n) - (bS_nR_1 - bS_nR_n)]$ and $[(cS_1R_1 - cS_1R_n) - (cS_nR_1 - cS_nR_n)]$. These sets of traces are hereafter referred to collectively as $aS_wR_x$, $bS_wR_x$, and $cS_wR_x$, respectively, and may be used as the input traces as will presently be described. Alternatively, the three sets of common depth point traces $aS_wR_x$, $bS_wR_x$ and $cS_wR_x$ can be stacked in accordance with common depth point stacking procedures to produce a single set of stacked traces $P_{xy}$ in which the subscript $xy$ refers to the xy coordinate positions of the common depth point. Although the unstacked input traces $aS_wR_x$, $bS_wR_x$ and $cS_wR$ yield more accurate results in the method of the present invention, as heretofore mentioned, it is often acceptable to use the stacked input traces $P_{xy}$ as the input traces to the method in order to reduce the quantity of data to be handled. It will be assumed that the stacked input traces $P_{xy}$ will be used to simplify explanation of the method.

Each of the input traces $P_{xy}$ is processed to produce traces $P_{xy}b_{00} - P_{xy}b_{nn}$, which corresponds generally to traces $P_xb_0 - P_xb_n$ heretofore described in connection with FIG. 11. These traces are compiled using equation (1), and are assigned to the stations adjacent the common depth point for the input trace as illustrated by the schematic drawing of FIG. 28, with trace $P_{xy}b_{00}$ at the common depth point $Q_{xy}$ for the input trace $P_{xy}$. Computations need only be made for the traces $P_{xy}b_{00} - P_{xy}b_{mn}$ in one quadrant relative to the common depth point $Q_{xy}$ for the input trace $P_{xy}$. The same traces may be positioned at the relative points in the other quadrants, assuming that a constant acoustic velocity is present for energy propagating into each of the other four quadrants from point $Q_{xy}$. Of course, if different velocities are to be used, then separate computations should be made for the traces in the respective quadrants.

The traces $P_{xy}b_{00} - P_{xy}b_{mn}$ may then be collated at the respective stations as heretofore described in connection with the table in FIG. 12. All of the traces collated at each station may then be processed in any manner heretofore described. Three-dimensional processing is achieved merely by including data derived from at least three input traces $P_{xy}$ which are located at three stations not in a straight line.

The processing of at least two of the three sets of common depth point data $aS_wR_x$, $bS_wR_x$ and $cS_wR_x$ provides three-dimensional resolution. The use of common depth point data collected along parallel lines, such as lines $a$, $b$ and $c$ in FIG. 27, simplifies handling and processing of the data. However, the common depth point lines do not need to be parallel in order to achieve a three-dimensional data image in accordance with the present invention.

FIG. 27 illustrates how conventional straight line methods for collecting data may be used to produce a three-dimensional data image. It will also be appreciated that more complex two-dimensional arrays of shot points and receivers can be used to collect the data if desired. For example, data collected in the method and system described in copending U.S. application entitled Three-Dimensional Common Depth Point Exploration, Ser. No. 39,867, filed May 22, 1970 by Maurice E. Trostle and assigned to the assignee of the present invention may be processed in accordance with the method of the present invention.

The method described above can be carried out by any general purpose digital computer having moderate to large capacity. The digital computer manufactured and marketed under the model designation TIAC by Texas Instruments, Inc., Dallas, Tex., which is particularly suited for processing seismic data of the types used herein is particularly useful in practicing this invention.

Although several preferred embodiments of this invention have been described in detail, it is to be understood that various changes, substitutions and alterations can be made therein without departing from the spirit and scope of the appended claims:

What is claimed is:

1. The method for determining the location of impedance discontinuities in a wave propagating medium from a plurality of digital input records each representative of wave energy returning to a receiving point from wave energy induced at a source point which comprises producing, in an automatic data processing machine, a data image having a plurality of coordinate points defining at least two spacial dimensions, each coordinate point having a composite value produced by combining a plurality of weighted amplitude values, each weighted amplitude value being derived by picking the amplitude value on a different input trace at the time required for wave energy to travel from the source point of each of the respective input records to the coordinate point and return to the receiving point for the respective input record and multiplying each of the picked amplitude values by a weighting factor that is a function of the depth and the horizontal distance between the source points and receiver points of the input trace from which the amplitude value is picked and the coordinate point for which the value is to be derived, wherein the weighting factor at a given depth increases as the horizontal distance increases to enhance the image of diffractors.

2. The method for determining the location of impedance discontinuities in a wave propagating medium from a plurality of digital input records each representative of wave energy returning to a receiving point from wave energy induced at a source point which comprises producing, in an automatic data processing machine, a data image having a plurality of coordinate points defining at least two spacial dimensions, each coordinate point having a composite value produced by combining a plurality of weighted amplitude values, each weighted amplitude value being derived by picking the amplitude value on a different input trace at the time required for wave energy to travel from the source point of each of the respective input records to the coordinate point and return to the receiving point for the respective input record and multiplying each of the picked amplitude values by a weighting factor that is an inverse function of the degree of correspondence between preselected amplitude values, the degree of correspondence being indicative of spectral reflectors.

3. The method of claim 2 wherein the coordinate points define three spacial dimensions.

4. The method for determining the location of diffractive impedance discontinuities in a wave propagating medium from a plurality of digital input records each representative of wave energy returning to a receiving point from wave energy induced at a source point which comprises producing, in an automatic data processing machine, the data image having a plurality of coordinate points defining at least two spacial dimensions, each coordinate point being a composite value derived from a combination of amplitude values, each amplitude value being the amplitude value at the time on a different input trace required for energy to travel from the source of the respective input trace to the coordinate point to the receiving point for the respective record, the amplitude values for each coordinate value being selected substantially only from those input traces having the midpoint between the source and receiving points a predetermined distance from the respective coordinate point such as to exclude energy which could have been returned by a specular reflector within a predetermined dip range.

5. The method of claim 4 wherein the coordinate points define three spacial dimensions.

6. The data image produced in an automatic data processing machine to determine the location of impedance discontinuities in a wave propagating medium from a plurality of digital input records each representative of wave energy returning to a receiving point from wave energy induced at a source point by establishing a plurality of coordinate points defining the data image in at least two spacial dimensions, each coordinate point having a composite value produced by combining a plurality of weighted amplitude values, each weighted amplitude value being derived by picking the amplitude value on a different input trace at the time required for wave energy to travel from the source point of each of the respective input records to the coordinate point and return to the receiving point for the respective input record and multiplying each of the pick amplitude values by a weighting factor that is a function of the depth and the horizontal distance between the source points sand receiver points of the input trace from which the amplitude value is picked and the coordinate point for which the value is to be derived, wherein the weighting factor at a given depth increases as the horizontal distance increases to enhance the image of diffractors.

7. The data image of claim 6 wherein the coordinate points define three spacial dimensions.

8. The data image produced in an automatic digital data processing machine to determine the location of impedance discontinuities in a wave propagating medium from a plurality of digital input records each representative of wave energy returning to a receiving point from wave energy induced at a source point by establishing a plurality of coordinate points defining the data image in at least two spacial dimensions, each coordinate point having a composite value produced by combining a plurality of weighted amplitude values, each weighted amplitude value being derived by picking the amplitude value on a different input trace at the time required for wave energy to travel from the source point of each of the respective input records to the coordinate point and return to the receiving point for the respective input record and multiplying each of the picked amplitude values by a weighting factor that is an inverse function of the degree of correspondence between preselected amplitude values, the degree of correspondence being indicative of spectral reflectors.

9. The data image of claim 8 wherein the coordinate points define three spacial dimensions.

10. The data image produced in an automatic data processing machine to determine the location of diffractive impedance discontinuities from a plurality of digital input records each representative of wave energy returning to a receiving point from wave energy induced in a wave propagating medium at a source point by establishing a plurality of coordinate points defining the data image in at least two spacial dimensions, each coordinate point being a composite value derived from a combination of amplitude values, each amplitude value being the amplitude value at the time on a different input trace required for energy to travel from the source of the respective input trace to the coordinate point to the receiving point for the respective record, the amplitude values for each coordinate value being selected substantially only from those input traces having the midpoint between the source and receiving points a predetermined distance from the respective coordinate point such as to exclude energy which could have been returned by a specular reflector within a predetermined dip range.

11. The data image of claim 10 wherein the coordinate points define three spacial dimensions.

* * * * *